US009882955B2

(12) United States Patent
Jamtgaard et al.

(10) Patent No.: US 9,882,955 B2
(45) Date of Patent: Jan. 30, 2018

(54) WIRELESS ANALYTICS IN PHYSICAL SPACES

(71) Applicant: Nearbuy Systems, Inc., San Mateo, CA (US)

(72) Inventors: Mark Jamtgaard, Mountain View, CA (US); Nathan Mueller, Mountain View, CA (US); Peter Sanford, San Francisco, CA (US)

(73) Assignee: Retailnext, Inc., San Jose, CA (US)

( * ) Notice: Subject to any disclaimer, the term of this patent is extended or adjusted under 35 U.S.C. 154(b) by 681 days.

(21) Appl. No.: 13/737,834

(22) Filed: Jan. 9, 2013

(65) Prior Publication Data

US 2014/0195380 A1 Jul. 10, 2014

(51) Int. Cl.
*G06Q 30/00* (2012.01)
*H04L 29/08* (2006.01)
*G06Q 30/06* (2012.01)
*H04W 4/02* (2009.01)
*H04W 12/08* (2009.01)
*H04W 84/12* (2009.01)
*H04L 29/06* (2006.01)

(52) U.S. Cl.
CPC ......... *H04L 67/02* (2013.01); *G06Q 30/0601* (2013.01); *H04L 67/22* (2013.01); *H04W 4/028* (2013.01); *H04L 63/0876* (2013.01); *H04L 67/2819* (2013.01); *H04W 12/08* (2013.01); *H04W 84/12* (2013.01)

(58) Field of Classification Search
CPC .................................. G06Q 30/0601–30/0645
USPC ................................................ 705/26.1–27.2
See application file for complete search history.

(56) References Cited

U.S. PATENT DOCUMENTS

2005/0239445 A1* 10/2005 Karaoguz ........... H04L 12/2803
455/414.1
2012/0192258 A1* 7/2012 Spencer ................ H04W 12/06
726/7

OTHER PUBLICATIONS

Jarman, M. (Nov. 21, 2010). Holiday shopper's key tool: Cellphone. Arizona Republic Retrieved from https://search.proquest.com/docview/807572261?accountid=14753.*

* cited by examiner

*Primary Examiner* — Resha Desai
(74) *Attorney, Agent, or Firm* — Dergosits & Noah LLP; Todd A. Noah

(57) ABSTRACT

A wireless analytics system and method are disclosed that take shoppers through an initial registration process, after which they can access the Internet quickly and easily every time they visit any of the retailer's stores. During future visits to any of the retailer's store locations the shopper's device is automatically granted network access as soon as it is within wireless range. Once on the network, a shopper can access websites, social networks, and shopping resources from across the mobile web. The system collects information about these access events, including the location and timestamp of each access event. The retailer may be notified when a shopper enters their store. This information may automate the check-in process for processes within the retail store or within a mobile application.

20 Claims, 22 Drawing Sheets

WIRELESS ANALYTICS IN PHYSICAL SPACES

TECHNICAL FIELD

The disclosed subject matter is related generally to wireless analytics.

BACKGROUND

Wireless LANs are ubiquitous today in both the professional world and our personal lives. Besides our homes and offices, Wi-Fi can be found in retail stores, hotels, airports, coffee shops, bookstores, libraries, schools, and other locations. Besides simply connecting laptops to Wi-Fi networks, people are increasingly using these networks to access the Internet from their mobile devices.

Providing free Wi-Fi access, or Amenity Wi-Fi, has become lucrative for many businesses since customers use free Wi-Fi as a convenience criterion when choosing establishments to patronize. For this reason, demand is increasing for Wi-Fi at retail locations.

In brick and mortar retail stores, where smartphones are continuing the trend that e-commerce started, in-store sales are influenced by online interactions. More and more frequently, that influence is taking place within the aisles of a brick-and-mortar store via mobile websites and smartphone apps. Whether done inside or outside the store, smartphones play an important role throughout the purchase process: in researching and choosing products, comparing prices, and checking inventory. They bring instant intelligence that lets informed purchases happen faster and changes the nature of impulse buying.

In the past, the shopper's path to purchase was a linear process. The shopper entered the store entrance, meandered through aisles of merchandise, and proceeded to the checkout aisle to pay. The shopping experience has changed. The smart phone allows omnichannel shopping—simultaneous online research and shopping while in the aisles of brick-and-mortar retailers. Shoppers routinely compare prices, research products, and purchase from e-commerce websites while in the physical brick-and-mortar store.

The new 'omnichannel' path to purchase encompasses a varied combination of online and in-store shopping tactics, driving the need for retailers to have web-like analytics for their stores that can provide insights into this new behavior. Retailers need a Wi-Fi analytics service that enables them to embrace omnichannel shoppers and make data driven decisions that will shape the future of shopping.

SUMMARY

Upon arrival in the store, smartphone users are welcomed with an offer to connect to the store's Wi-Fi network. The embodiments detailed in this disclosure take shoppers through a one-time registration process, after which they can access the Internet quickly and easily every time they visit any of the retailer's stores.

The system includes a frictionless method to onboard Wi-Fi clients onto the retailer's network. FIG. 1 illustrates the steps for a shopper to access a retailer's Wi-Fi network. Step one requires the shopper to connect to the store's guest Wi-Fi network. Step two displays the retailer's customized landing page. Step three collects information from the shopper such as their email address, social media login, CRM loyalty card number, etc. The retailer may customize the information collected. Step four displays the terms and conditions for network access and requires the shopper to accept the terms to be granted access. Step five grants the shopper network access. Steps one to five are only required once during the initial registration process. During future visits to any of the retailer's store locations the shopper's device is automatically granted network access as soon as it is within wireless range. The retailer may update their terms and conditions at any time. The next time an enrolled shopper enters one of the retailer's stores, the shopper will be asked to agree to the new terms and conditions.

Once on the network, a shopper can access websites, social networks, and shopping resources from across the mobile web. The system of this disclosure, the Wireless Analytics Platform, collects information about the entrance and exit times, frequency of visits, dwell times, websites visits, mobile application usage, search terms, products browsed, and e-commerce transactions, as well as the location and timestamp of each of these events.

The retailer may be notified when a shopper enters their store. This information may automate the check-in process for processes within the retail store or within a mobile application.

Through the Wireless Analytics Platform's customer web interface, retailers may create or modify landing pages and terms and conditions of service; delegate tasks to store managers (e.g. creating unique holiday landing pages for their store); view an analysis of the collected data such as understanding of shopping behavior, the impact of the digital experiences in the store, i.e. websites viewed, search terms used, products browsed, and ecommerce transactions conducted, tie physical location to online behavior (Answers "where do my shoppers use Amazon's® web site the most often in my store?"). Combining a profile of online activity with corresponding locations provides a new class of data and new analytic opportunities.

BRIEF DESCRIPTION OF THE DRAWINGS

Like reference symbols in the drawings indicate like elements.

DETAILED DESCRIPTION

Online web analytics rely on tracking cookies to track page views and click through within the World Wide Web. By analogy, the smart phones' Wi-Fi MAC address is used as a "physical world tracking cookie" to track repeat users. Although this disclosure is written assuming a Wi-Fi MAC address, other network IDs such as a Bluetooth MAC address, cellular ID, or Near-Field Communication (NFC) ID, etc. are also covered. Furthermore, this embodiment has applicability to other industries besides retail, such as hospitality and banking, and to other wireless devices besides smart phones, such as tablets and other computing devices.

Figure 1:
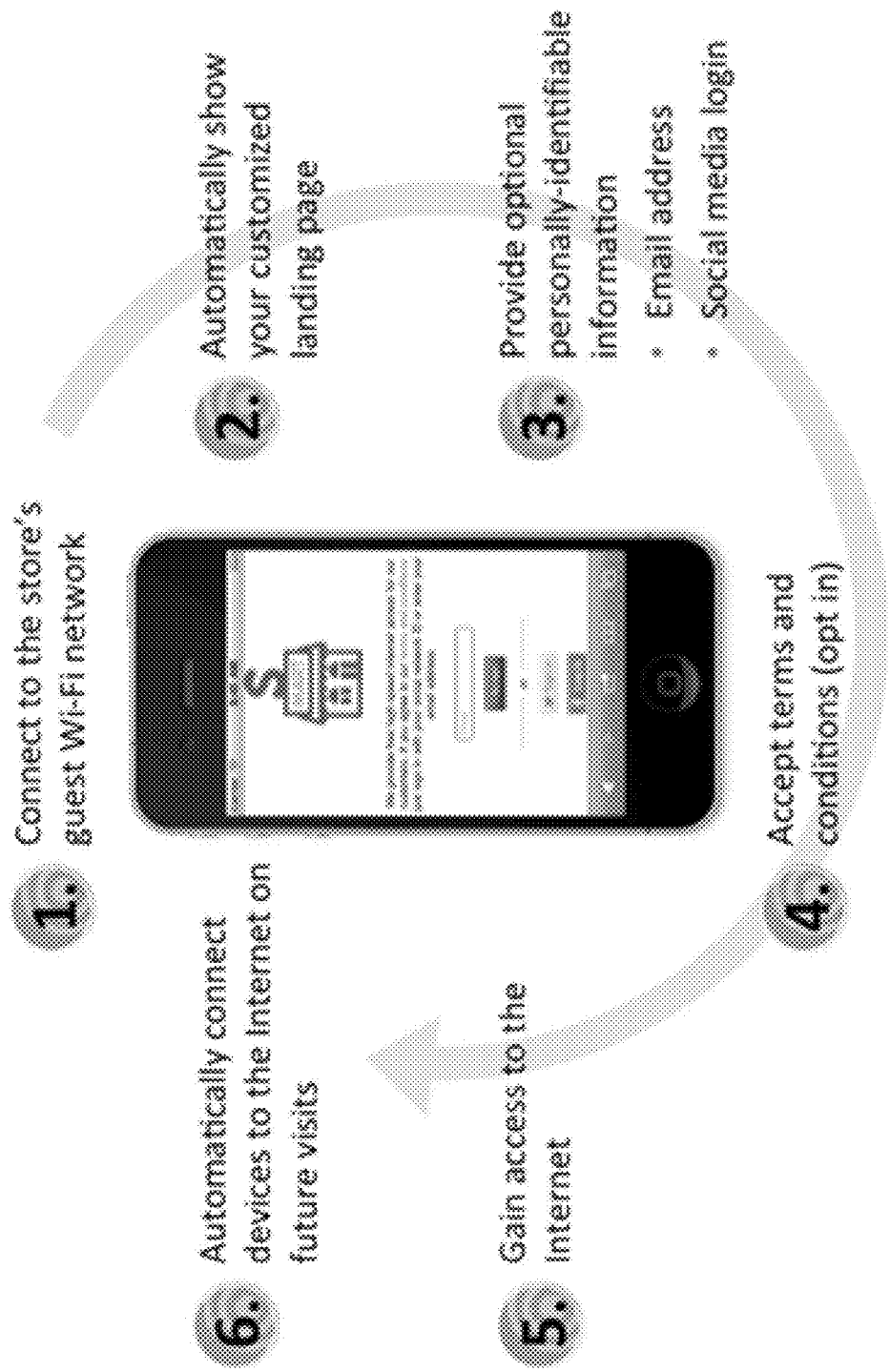
FIG. 1 illustrates a frictionless Wi-Fi experience for shoppers.
Figure 2:
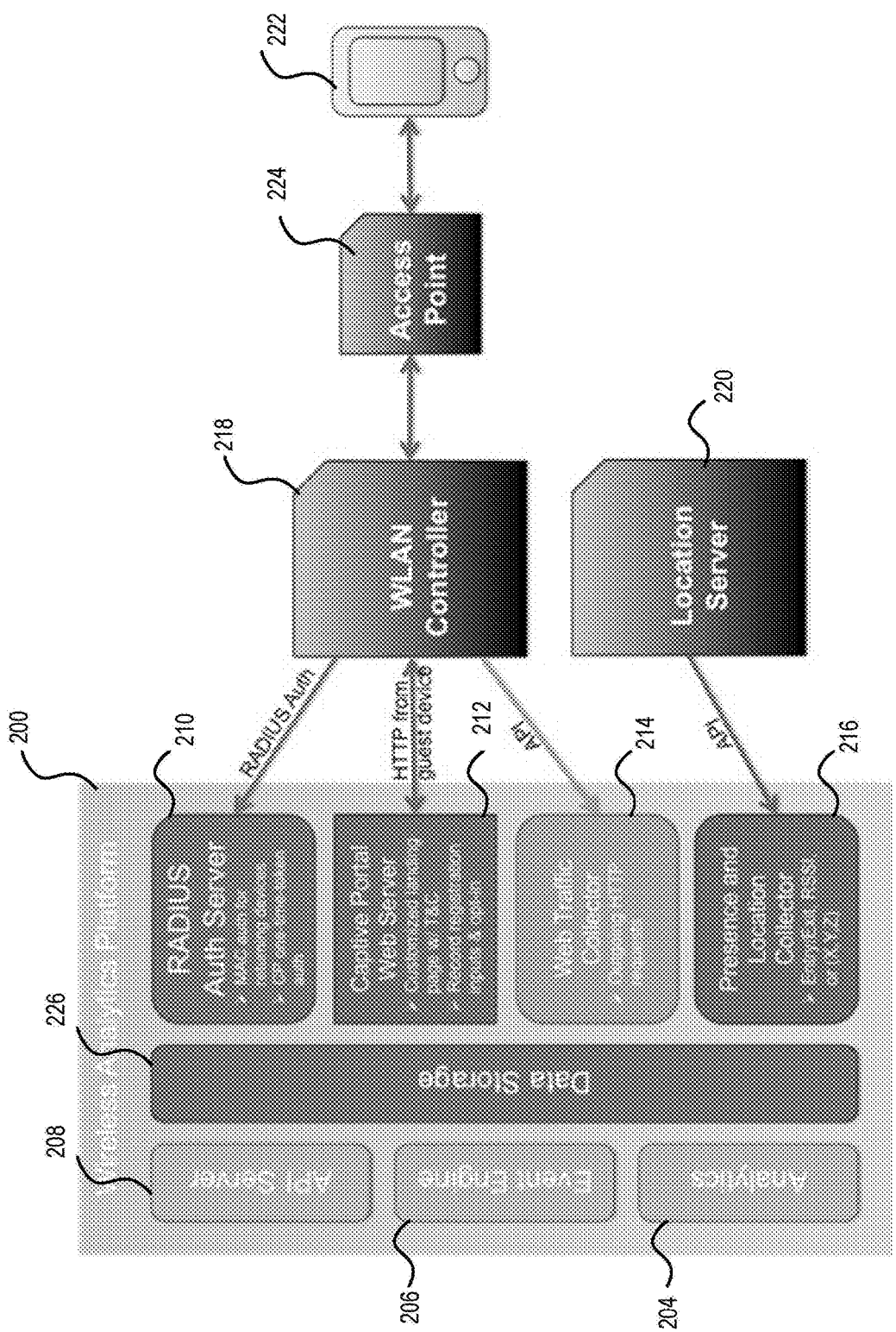
FIG. 2 illustrates a Wireless Analytics Platform.

The Wireless Analytics Platform 200, illustrated in FIG. 2, comprises an Analytics Engine 202, Event Engine 204, Application Programming Interface (API) Server 206, Authentication Server 208, Captive Portal Web Server 210, Web Traffic Collector 212, Presence and Location Collector 214, WLAN infrastructure 216, and a Location Server 218.

The wireless client 222, typically a smart phone, connects to the retailer's Wi-Fi network via the APs 224. Multiple APs may be deployed in larger spaces. Typically the APs connect to a WLAN controller. This embodiment covers WLANs with thin APs and a WLAN controller as well as those utilizing APs without a WLAN controller. The authentication server grants access to the Internet to clients that have previously registered by recognizing the MAC addresses. For clients connecting to the retailer's network for the first time, the Captive Portal serves a customized landing page and records the registration. The Captive Portal generates a one-time authentication token that is passed to the authentication server and grants them Internet access. The Web Traffic Collector records outgoing HTTP requests, which are stored in Data Storage 226 for analysis.

The Wireless Analytics Platform may be deployed with either a presence or location server or both. In these cases, the Presence and Location Collector is recording the entry and exit times of clients and their X, Y, Z location periodically. The Event Engine views all data streaming into the Wireless Analytics Platform, comparing it against pre-defined rules. If the incoming data matches the conditions of a rule, an action is performed. The Analytic Engine processes the incoming data and provides a user interface for viewing the analysis and generating reports. Finally, the API Server allows the data collected to be queried and loaded into external applications and services.

The Wireless Analytics Platform stores all the following information including the respective date and timestamp:
1. MAC address. For every device seen on the Wi-Fi network, the system records the MAC address. The MAC address is unique to each device and may be used as a persistent identifier of the device.
2. Unassociated client presence and location. The presence and location of unassociated clients. Most Wi-Fi enabled devices send probe requests looking for nearby Wi-Fi networks. These signals are detected when they are in range of the retailer's wireless network infrastructure, and are recorded. The entry and exit time of shoppers (presence) and whether they are a new or returning shopper is determined. Furthermore, these signals can be used to estimate the physical location of the shoppers.
3. The presence and location of associated clients. The system records the entry and exit times, as well as the physical location of devices associated to the retailer's Wi Fi network.
4. Enrollment status. When onboarding, a new user is presented with terms and conditions. The system records whether a user accepts or rejects these terms.
5. The system records the device type, operating system type and version, browser type, and screen size.
6. Volume of web traffic in page loads.
7. Websites visited. The system records the websites visited by each user.
8. Search terms. The system record the search terms queried on web search engines, e commerce websites, product research websites, and comparison-shopping websites.
9. Online behavior. The system can analyze the content of webpages for specific features of interest as well as specific behaviors. These features and behaviors are customizable. In one embodiment for retailers, the features tracked are product names and values; the behaviors tracked are whether the user browses the product or purchases the product. Specifically, the following are tracked for retailers:
   a. The names and prices of products browsed on e-commerce websites.
   b. The names and prices of products purchased on e-commerce websites.
   c. Product names researched at product review, forums, and comparison-shopping sites.
10. Mobile application behavior. User's behavior within applications can be inferred if that application makes requests to the Internet. The system stores the following:
   a. The application name.
   b. Product names and values within comparison-shopping applications, barcode scanning applications, and other shopping applications.
11. The language of the websites and search terms.

The Wireless Analytics Platform's functional pieces, depicted in FIG. 2, may be deployed in various ways, split between one or more data centers and the retailer's stores. The wireless captive portal, analytics, and data storage reside in a cloud data center. Some deployments require the data collection functions to be deployed in each retail store. It is expensive to have a server in each store, however. Therefore, a more desirable deployment model is to have multiple stores connected to a data center hosting the server. This data center hosts the data collection component and is connected to the cloud where the captive portal, analytics, and data storage server reside.

Figure 3:
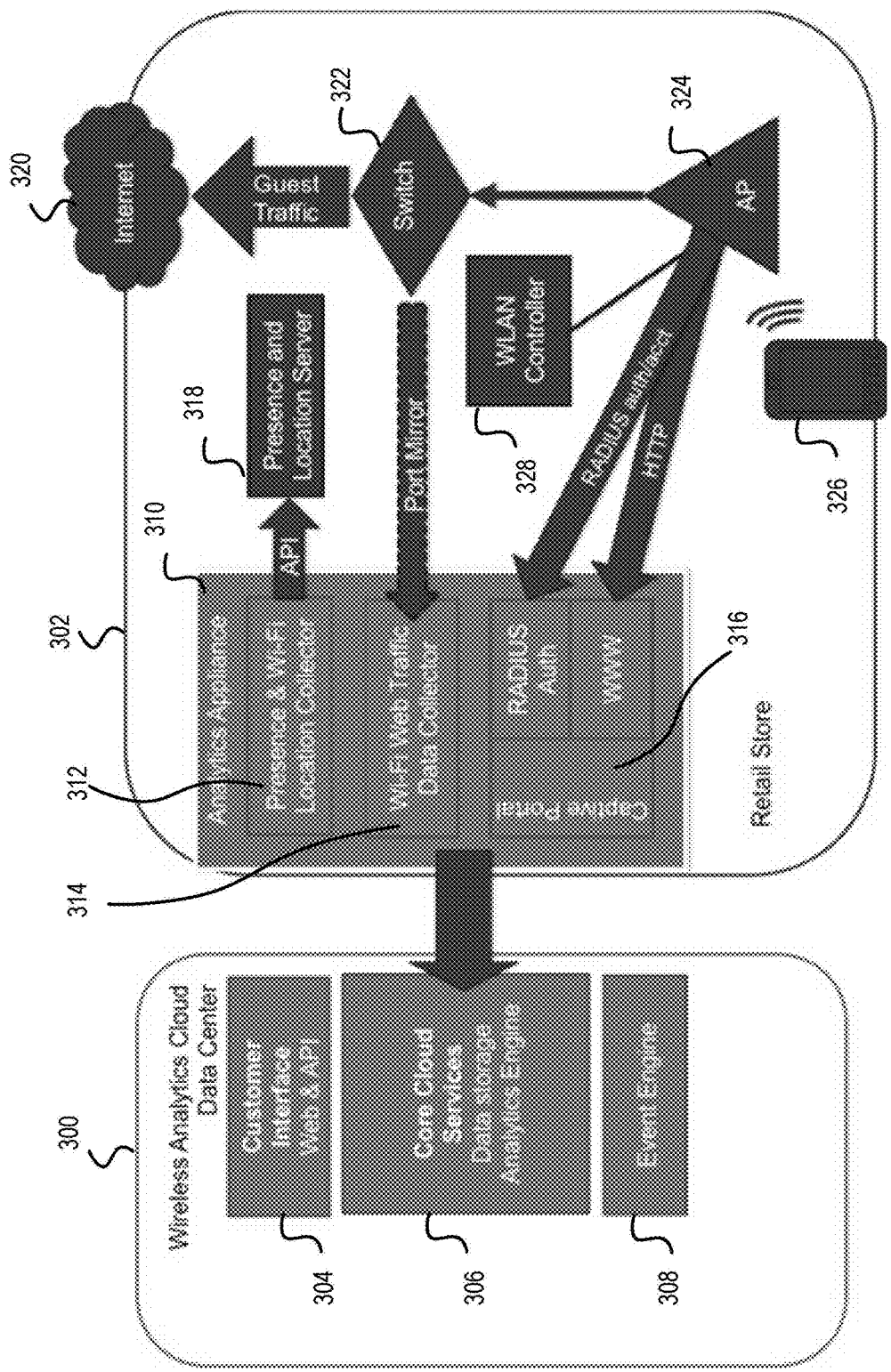
FIG. 3 illustrates a store appliance deployment architecture.

One embodiment of the deployment architecture is illustrated in FIG. 3. The Wireless Analytics Cloud Data Center and Analytics Appliance are functions within this disclosure. In this embodiment, an Analytics Appliance 310 is located in the store 302. The Analytics Appliance 310 is comprised of the Captive Portal 316, Authentication Server 317, Wireless Traffic Data Collector 314, and the Presence and Location Collector 312. At each store 302, Wi-Fi APs 324 and the WLAN controller 328 are connected to either a store switch 322, router, firewall, or other device before network address translation that supports either port mirroring or proxying to the Analytics Appliance 310. In the Wireless Analytics Cloud Data Center 300, the core cloud services 306 (including Analytics Engine and Data Storage), Event Engine 308, and Customer Interface 304 connect to the Analytics Appliance 310 over a secure connection.

Figure 4:
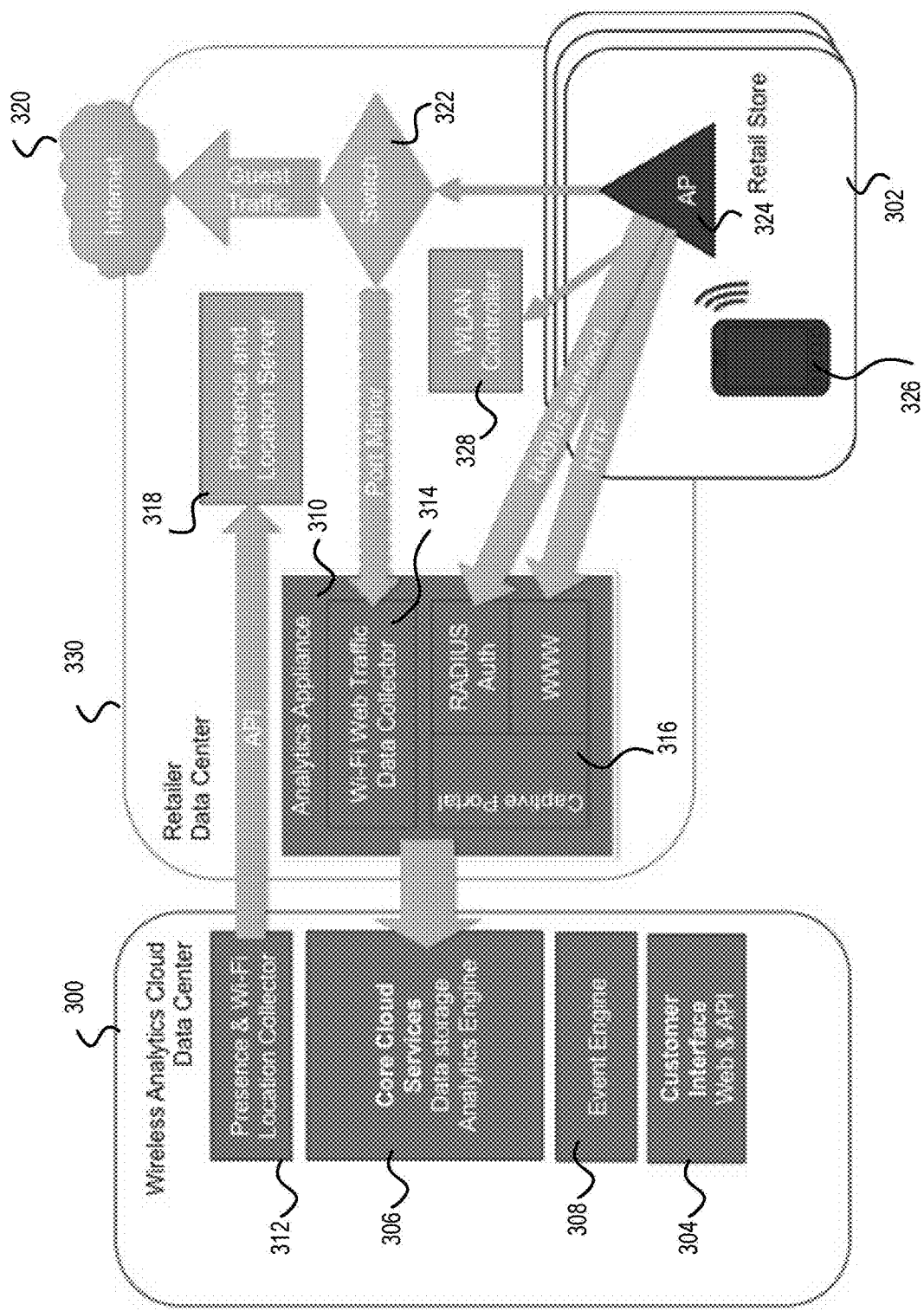
FIG. 4 illustrates a centralized data center deployment architecture.

In a second possible embodiment, illustrated in FIG. 4, multiple retail stores 302 are connected to the retailer's data center 330. The WLAN controller 328 is hosted in the retailer's data center 330, reducing the hardware requirements in the stores 302. In this embodiment, an Analytics Appliance 310 is located in the retailer's data center 330. The Analytics Appliance 310 is comprised of the Captive Portal 316, Authentication Server 317, and Wireless Traffic Data Collector 314. At each store 302, Wi-Fi APs 324 connect to the WLAN controller 328 in the retailer's data center 330. The Analytics Appliance 310 is connected to the packet stream via a switch 322, router, firewall, or other device that supports either port mirroring or proxying. In the Wireless Analytics Cloud Data Center 300, the Core Cloud Services 306 (including Data Storage and the Analytics Engine), connect to the Analytics Appliance 310 over a secure connection. Likewise, the Presence and Location Collector 312 connects to the Presence and Location Server 318 over a secure connection.

Figure 5:
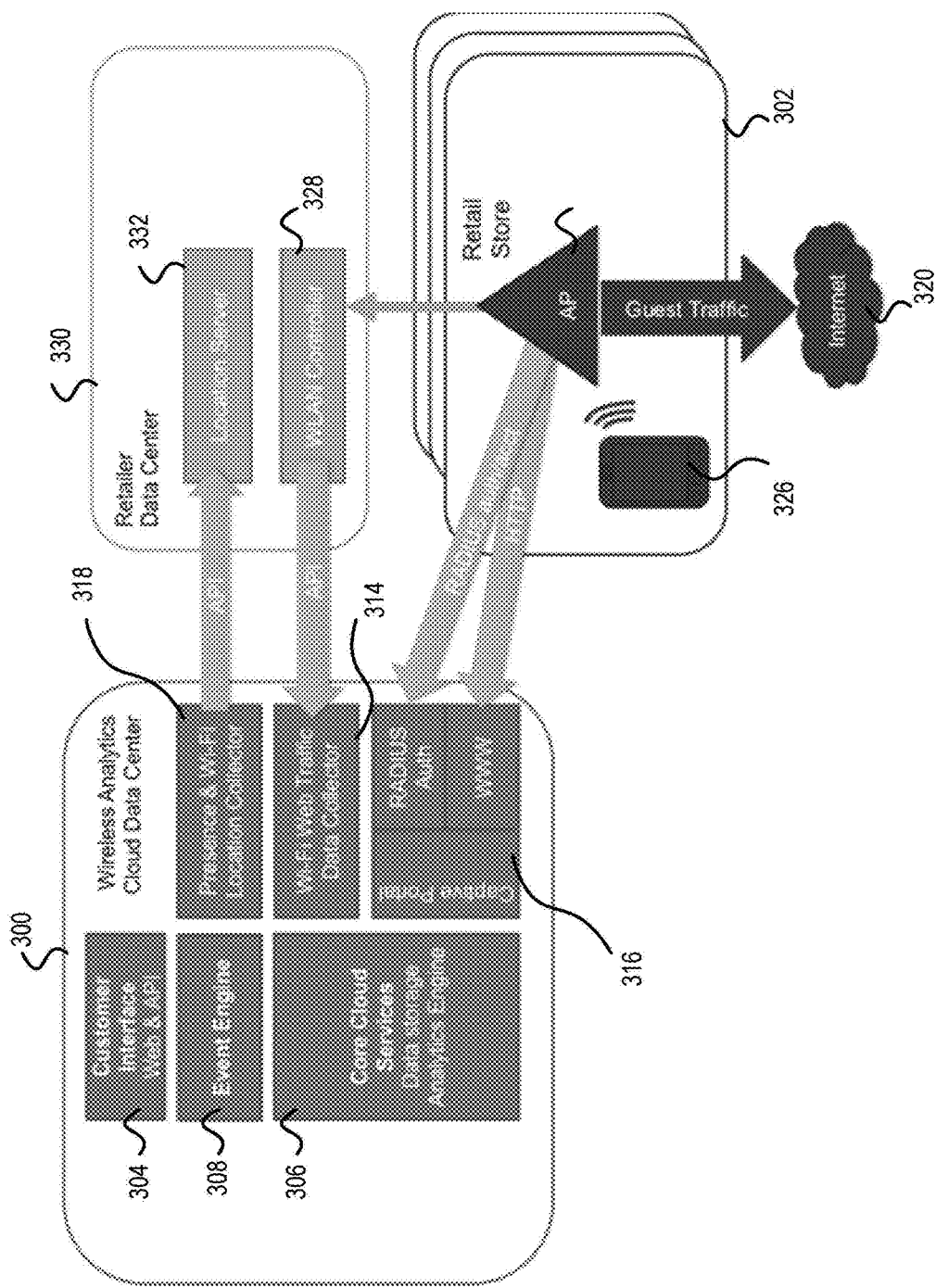
FIG. 5 illustrates cloud deployment.

In a third possible embodiment shown in FIG. 5, the APs 324 forward HTTP request headers and bodies directly to the WLAN controller 328 in the retailer's data center 330. The WLAN controller 328 directly forwards these HTTP headers and bodies to the Web Traffic Collector 314 in the Wireless Analytics Cloud Data Center 300. This embodiment has the advantage of all functionality being contained in the Wireless Analytics Cloud Data Center 300 with no need to deploy hardware to the retailer's data center or stores. Another advantage of this embodiment is that the bandwidth required is reduced because only the headers are forwarded to the analytics platform.

The guest Internet traffic may be routed to a connection that is direct to the store as shown in FIG. 5, or it may be routed through the retailer's data center 330 as in FIG. 4.

Besides these three embodiments, the functional pieces may be deployed in many other different configurations. Other embodiments include different methods of data collection, include Cisco®'s WCCP and Aruba®'s ESI protocols. These deployment models are a small representation of the possible combinations the functional blocks may take across data centers and retail stores.

Captive Portal and Authentication Server

The Captive Portal forces a client to a special web page before they are granted access to the Internet. This web page may put the user immediately onto the network, enroll the client after acceptance of the network's terms and conditions, or request more information such as a loyalty card number or email. A customer only needs to complete this registration process once. The customer is immediately allowed access to the network on subsequent visits to any of the retailer's stores.

Figure 6:
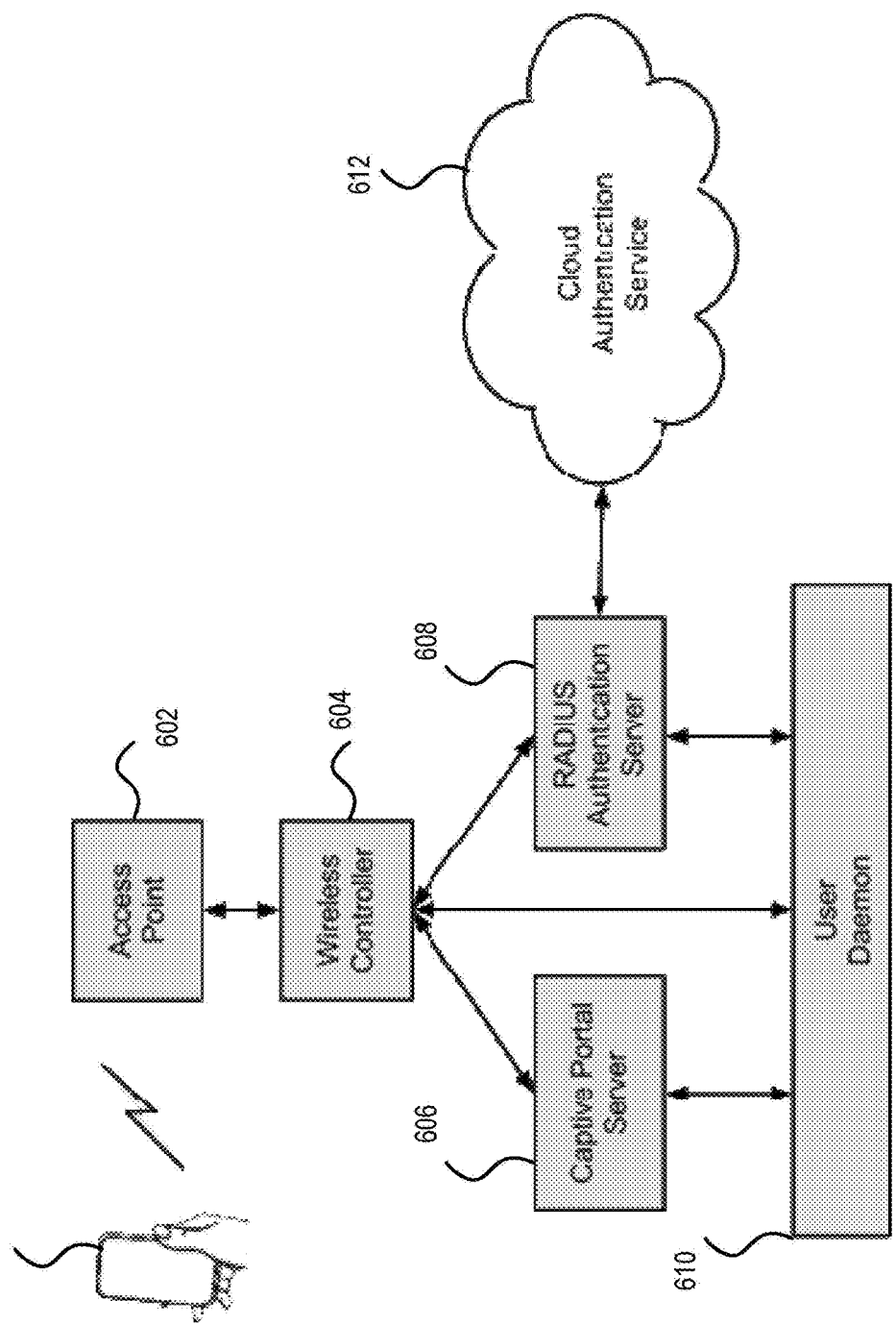
FIG. 6 illustrates a captive portal.

The Captive Portal is illustrated in FIG. 6, and comprises a Captive Portal Server 606, Authentication Server 608, a User Daemon 610, and a Cloud Authentication Service 612. In one embodiment, the Authentication Server 608 is a RADIUS server.

A first time user causes the following steps within Captive Portal:

1. When the client joins the wireless network, the AP 602 or Wireless Controller 604 checks with the Authentication Server 608 if the client's MAC address is allowed access. The server 608 searches its table of authenticated MAC addresses for a match. If a match is not found, it requests authentication from the Cloud Authentication Server 608.
2. If the MAC address is also not found in the Cloud Authentication Server 608, authentication fails and the captive portal process begins.
3. When the client's browser makes a request, the AP 602 or Wireless Controller 604 redirects the client to the captive portal page and includes in a Uniform Resource Locator (URL) or Uniform Resource Identifier (URI) the MAC address and the client's original destination.
4. The captive portal generates a one time token valid for a short period of time and passes it to the RADIUS Authentication Server 608.
5. The captive portal server 606 serves the portal page to the client including the one time token.
6. The client accepts the terms and conditions and provides optional registration information to the captive portal server.
7. After the user accepts the terms, the client posts the authentication token to the Wireless Controller 604.
8. The Wireless Controller 604 verifies the token and authenticates the client with the Authentication Server 608. The Wireless Controller 604 redirects the client to the original webpage.
9. The client's MAC address is added to the Authentication Servers database and pushed to the Cloud Authentication Service 612.
10. The User Daemon 610 receives the username, browser type, and other registration information from the captive portal. The User Daemon also receives the MAC address and user name from the RADIUS Authentication Server 608.
11. The User Daemon 610 matches records from the captive portal and RADIUS Server 608 to create a complete record of MAC address, browser type, and registration information.
12. Finally, the User Daemon 610 needs to determine the physical store location that the client is visiting. In a data center or cloud deployment, the Analytics Appliance may be supporting more than one store location. The User Daemon 610 queries the Wireless Controllers in each store to determine the location where the client is located.

The Captive Portal takes the following steps for a returning user when the architecture includes a RADIUS server 608:

1. When the client joins the wireless network, the AP 602 or Wireless Controller 604 checks that the client's MAC address is authenticated with the RADIUS server. The RADIUS server 608 checks a table of authenticated MAC addresses for a match. If a match is not found, it requests authentication from the Analytics Cloud Service.
2. If a match is found, the RADIUS Server 608 authenticates the client.

The Captive Portal takes the following steps for a returning user when the architecture does not includes a RADIUS server 608:

1. When the client joins the wireless network, they are redirected to the captive portal landing page.
2. The captive portal recognizes the shopper's MAC address and let them pass as soon as possible automatically.

Figure 7:
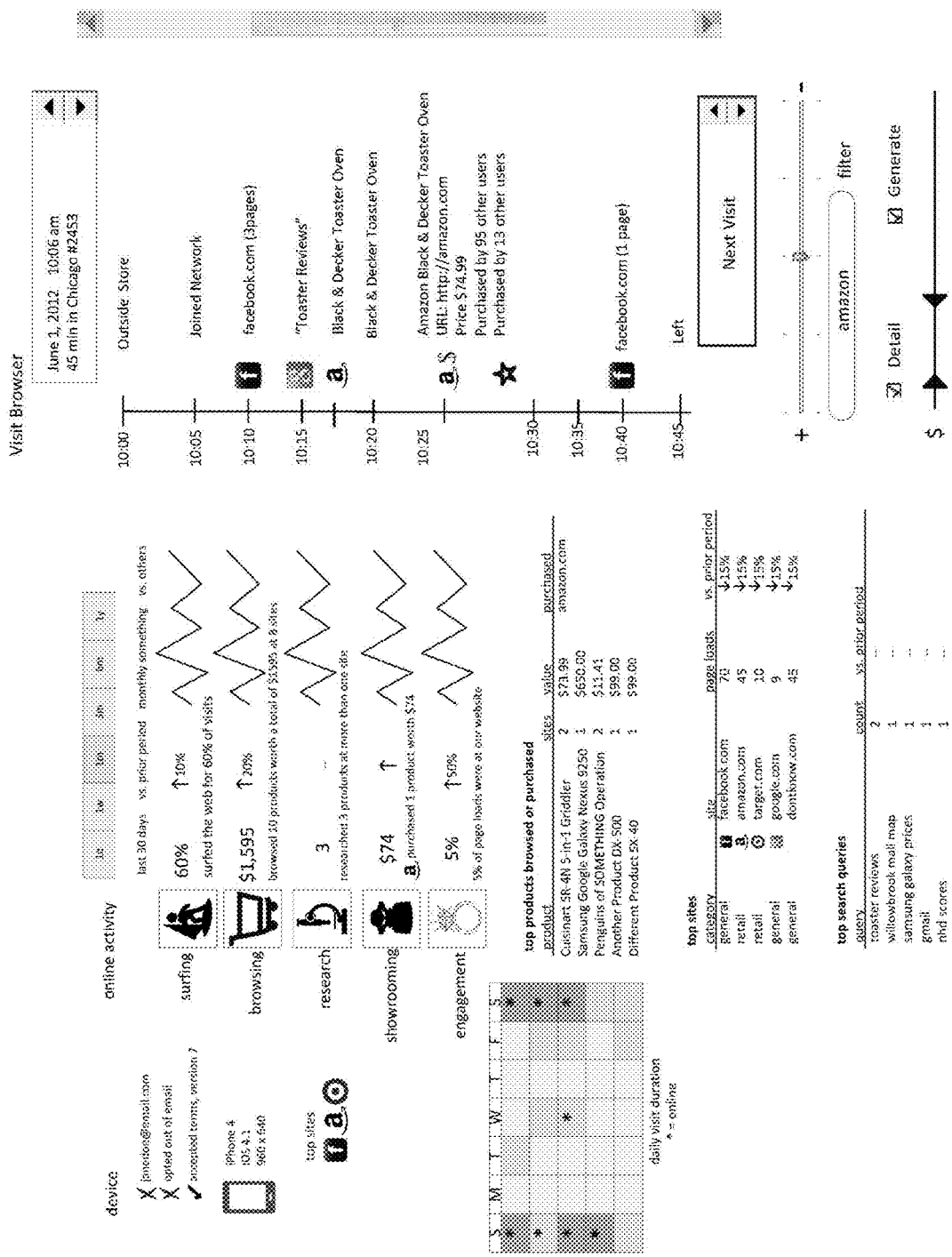
FIG. 7 illustrates is a captive portal sequence diagram.

FIG. 7 illustrates an example captive portal sequence using an iPhone and a Motorola WLAN.

Web Traffic Collector

The Web Traffic Collector stores outbound HTTP request headers and bodies for analysis to discover the websites visited, mobile application usage, search terms submitted, and details about the webpage visits such as product name and price, as well as if the product was browsed or purchased.

Figure 8:
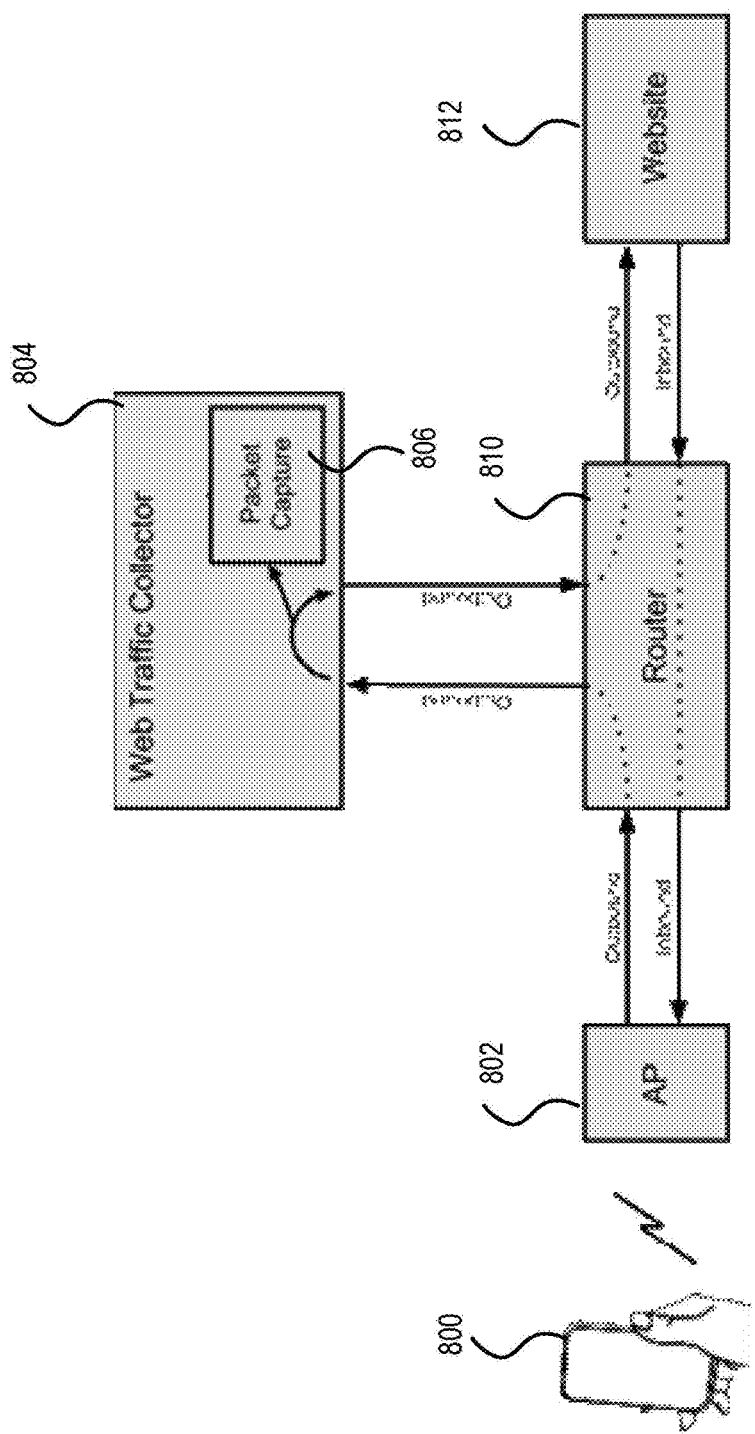
FIG. 8 illustrates packet capture.
Figure 9:
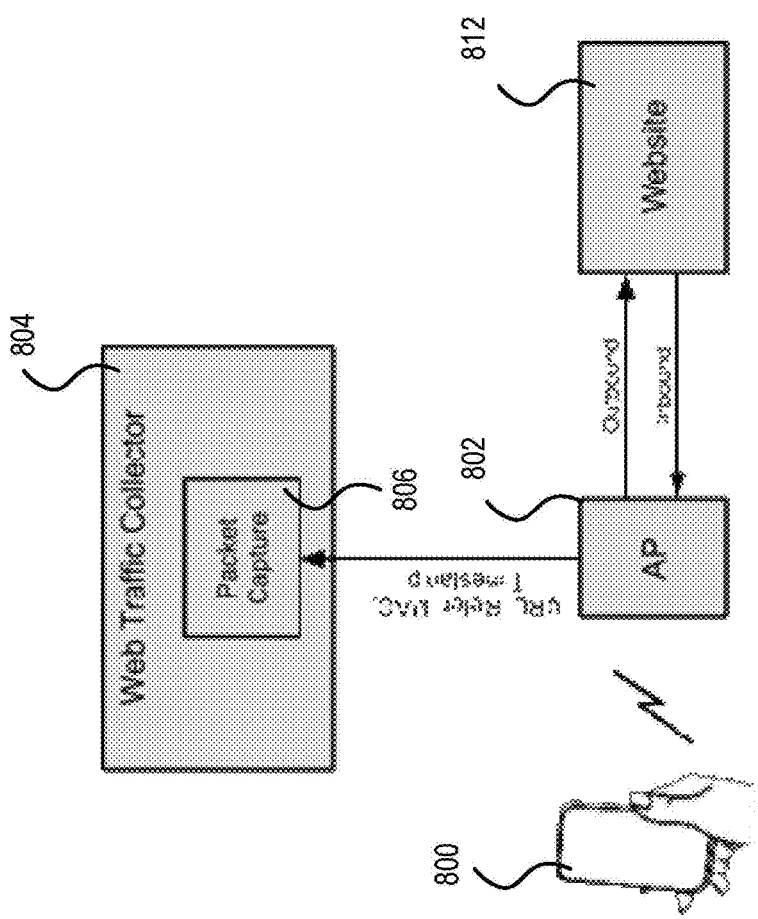
FIG. 9 illustrates packet capture directly from access points.

In one embodiment, a router 810 connected to the APs 802 or wireless controller is mirrored or proxied to a Web Traffic Collector 804. This embodiment is illustrated in FIG. 8. When a client device 800 makes a request to a website 812 while connected to the store's network, the router 810 connected to the APs 802 proxies the outbound packets to the Web Traffic Collector 804. While this embodiment is described using a router, any device that can mirror or proxy traffic could be utilized including a switch or firewall. The Web Traffic Collector 804 stores a copy of the packet for analysis and sends the packet back to the router 810. The router 810 sends the packet to the destination website 812. The return inbound packet from the website 812 is routed directly to the client device 800. Analyzing the request packets rather than the response packets reduces the bandwidth required between the router 810 and the Web Traffic Collector 804.

In a second embodiment, enhanced APs 802 may process the outbound packets and extract the URL, body, referrer, MAC address, and a timestamp from each outbound HTTP packet. The APs 802 forward this information to the Web Traffic Collector 814. This conserves bandwidth as the entire packet does not need to be sent to the Web Traffic Collector 814. Furthermore, an Analytics Appliance is not needed at either the store or the customer's data center.

Figure 10:
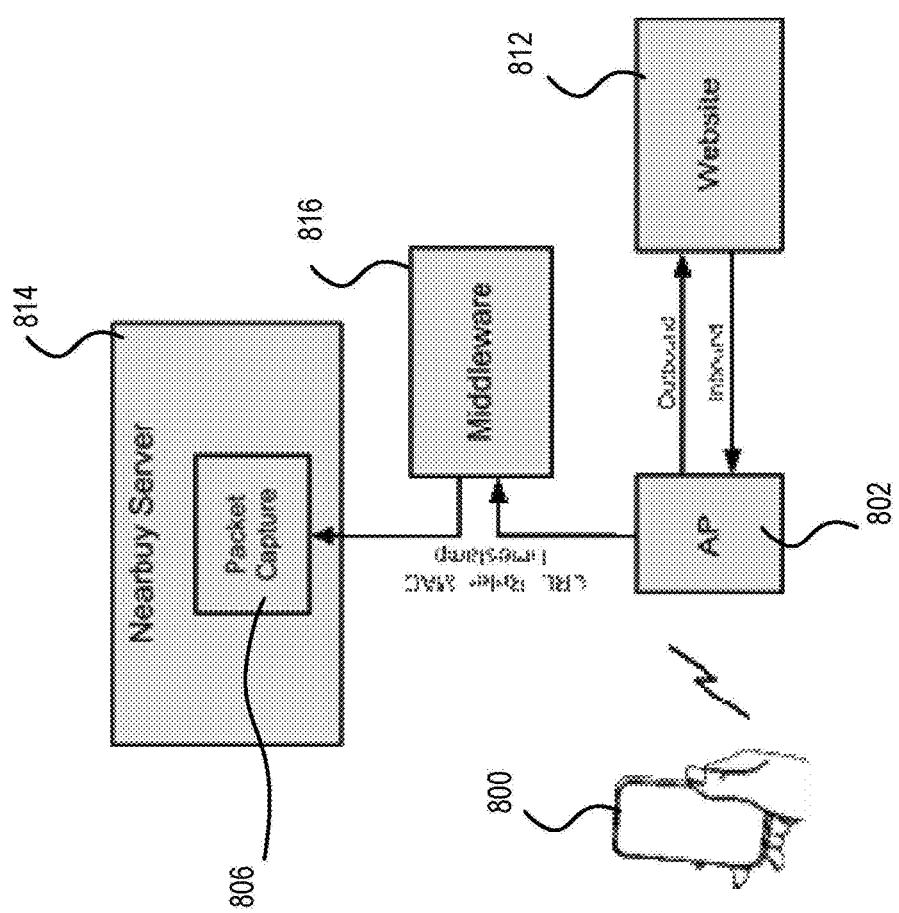
FIG. 10 illustrates packet capture directly from access points with middleware.

In a third embodiment, middleware software 816 is positioned between the APs/wireless controller 802 and Web Traffic Collector 814. This architecture is illustrated in FIG. 10.

Web Traffic Analysis

The HTTP request headers and bodies stored by the Web Traffic Collector 804 are analyzed to discover user behavior including the websites users visit, search terms submitted, and details about the webpage visits such as product name and price, as well as if the product was browsed or purchased. This analysis requires three components. First, a way to determine the primary website a user intended to visit. Second, URLs need to be decoded against canonical URLs to extract search terms and website actions. Third, the visited website needs to be fetched by the system in order to record details about the webpage such as product names and prices.

Primary Webpage Discovery

The TCP packets may be reconstructed and the intended webpage inferred. The first task, TCP packet reconstruction, is well known. The second, discovering the webpage the user intended to visit, is difficult because a single webpage often includes content, images, and advertising from hundreds of different sites. The Web Traffic Collector observes packets without any context about how they compose a webpage. The packets include the URL, referring URL, MAC address of the client, and a timestamp. There is no clear delineation between different web pages or elements within a web page. The Web Traffic Collector only sees the pieces not the whole. In this disclosure, the following embodiment solves this problem and extracts from the stream of packets a list of the top-level webpages the user intended to visit.

Figure 11:
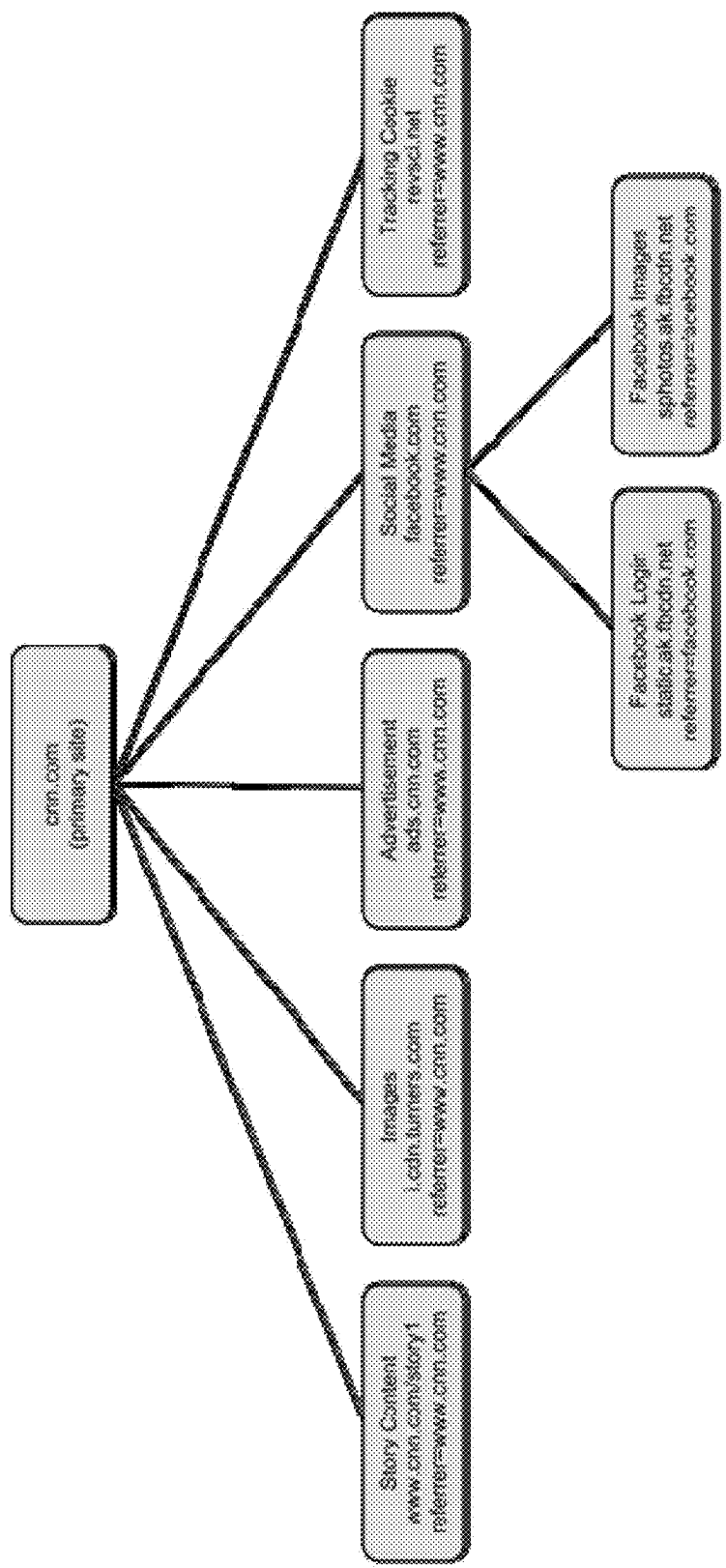
FIG. 11 illustrates a website link tree.

For example, when www.cnn.com is entered into a browser address bar, the CNN® page including content, images and advertising is loaded from disparate servers in hundreds of separate requests. For example, content is retrieved from i.cdn.turners.com, advertisements from icompass.insightexpressai.com, and social media from facebook.com. FIG. 11 illustrates a website's document object model if viewed as a tree structure. The primary site, www.cnn.com, in this simplified example, loads content from five sources including content, images, advertisements, social media, and a tracking cookie. The social media Facebook® login is an iframe and loads its own content from fbcdn.net.

The Packet Capture device observes the URL requests without the context of how they compose the complete www.cnn.com website. To aid piecing this together, the HTTP header field "referer" is examined for each request. The "referer" field identifies the webpage from which a link was followed. Given the HTTP header "referer" field, our goal is to determine the primary page that the user intended to load and filter out all the requests for content, images, advertisements, etc.

This embodiment solves this problem in two steps. First, a count is kept of the number of "referer" fields that point to a respective URL. When the count for the referee URL exceeds a threshold, it is sent to the Wireless Analytics Cloud Service. This simple filter does a good job of filtering out images, but does not handle iframes.

The second step builds a blacklist URL database based on historical data. In the cloud, each URL is assigned points. URLs with more points are more likely to be primary sites. Points are assigned as follows:
1. A web page with no referrer is assigned a large number of points.
2. A web page referring to the primary site is assigned a few points.
3. A web page referring to a site other than the primary site is assigned negative points.

Within this framework, primary sites will have a large positive value. Sites that are not primary sites, for example ad.doubleclick.net, will have large negative values. Sites with negative values exceeding a threshold are added to a blacklist database. This blacklist database is used to filter primary sites from the elements that compose them.

HTTP Request Header and Body Decode

The HTTP request needs to be decoded to determine what actions were taken at a website. This information is encoded in the HTTP header and body for each website uniquely. For example, when a search is performed at www.google.com a HTTP request to Google's servers embeds in the URL the search terms for the query. By a priori knowing the canonical form of the URL for a Google® search, the search terms can be extracted from the URL. These canonical URLs are specific to each individual website. The Wireless Analytics Platform stores a database of canonical URLs for each website behavior analyzed. The HTTP request is queried against a database of hostnames and canonical URLs. This technique is general enough to apply to not just search terms but all actions taken within a HTTP session. For example, this same technique will decode a product search performed by a barcode scanning application.

Webpage Details Collection

In order to collect details about webpage visits, such as product names and prices, the webpages may be fetched independently because the Web Traffic Collector does not monitor HTTP responses. These webpages may be profiled in order understand how to extract the detailed information of interest from the HTML.

Figure 12:
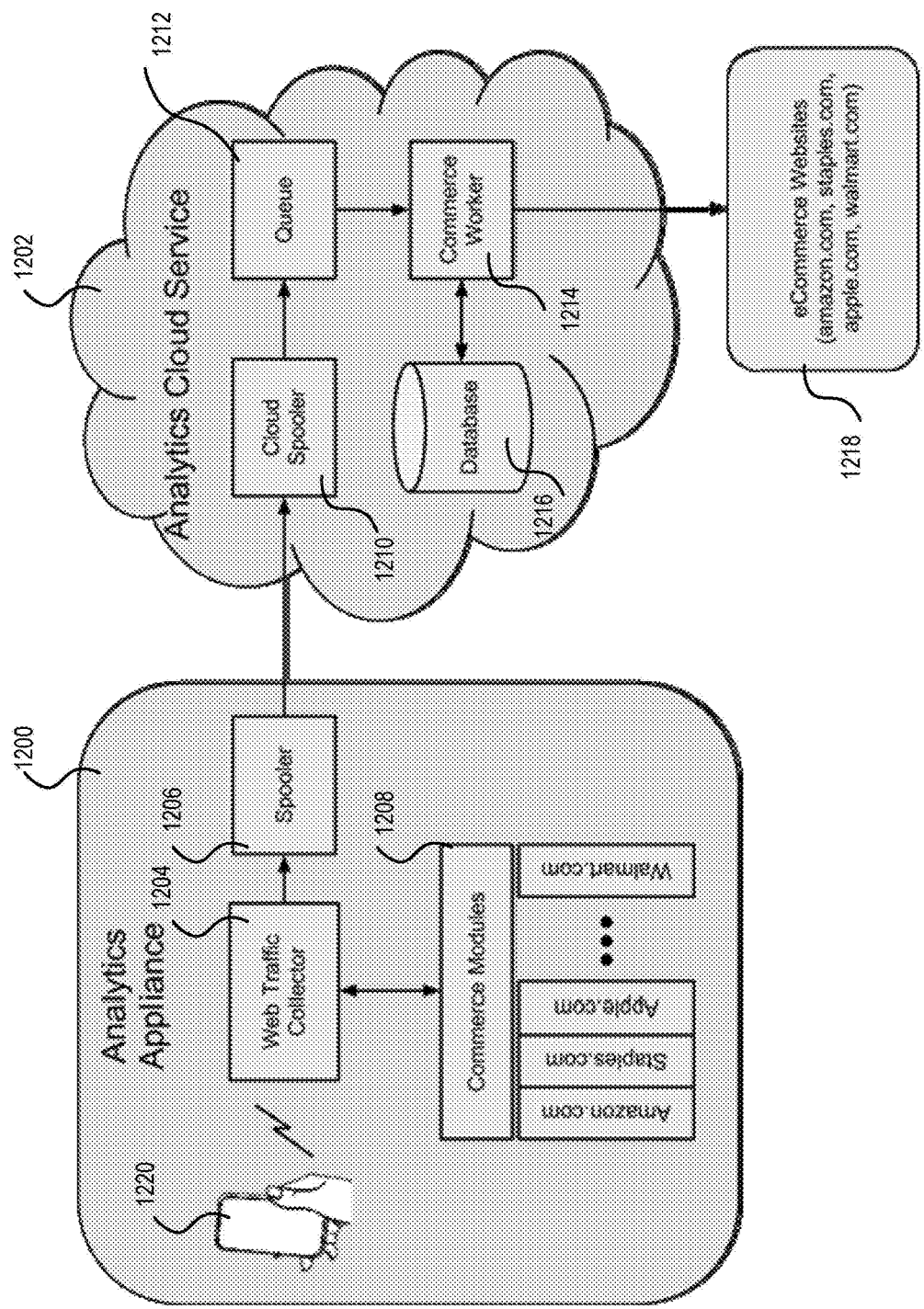
FIG. 12 illustrates a commerce details collection.

FIG. 12 is a block diagram of the system for collecting commerce statistics. Although this embodiment is specific to retail, the concepts involved in collecting details about online behavior applies to many fields. The location of the functions of the Analytics Appliance 1200, such as Web Traffic Collector 1204, Store Spooler 1206, and Commerce Modules 1208 may be either in the store, in a centralized data center, or in the Wireless Analytics Cloud data center, depending on the deployment configuration as illustrated in FIG. 3, FIG. 4, and FIG. 5.

When a shopper makes a HTTP request to an e-commerce website 1218, a copy is sent to the Web Traffic Collector 1204. Next, the Commerce Modules 1208 evaluate the HTTP request message. The module for the respective e-commerce website parses the HTTP message including the URL and returns a product identifier and whether the shopper is browsing or purchasing the item. This information is sent to the Spooler 1206 and transferred to the Analytics Cloud Service 1202. In the cloud, the webpage is fetched and the product name and value are recorded. The Commerce Worker 1214 pulls from the queue 1212 and fetches the HTML webpage. Using a prior knowledge about where the product name and price are located within the HTML, the Commerce Worker 1214 parses the name and price from the HTML and stores them into the user's record along with whether the product was browsed or purchased.

Custom Details Collection

Similar to the commerce details collection, the system can be extended to analytics for other industries, such as hospitality, through the custom details collection. Hotels in Las Vegas have restaurants and theaters that they would like their guests to attend. By measuring how often guests utilizing the hotel's Wi-Fi make reservations for restaurants, shows, or other activities at other locations, they can optimize their advertising and promotions. In this case, Wireless Analytics Platform extracts the restaurant and event pages browsed, reservations made, and event tickets purchased.

Application Details Collection

A user's behavior within applications can be profiled if that application makes requests to the Internet. Application profiling is important to retailers for many reasons. First, shopping and comparison applications such as Amazon® Mobile, Amazon Price Check, eBay® Mobile, and Red Laser® lead to lost sales. Second, retailers can use information about the applications on shoppers' phones to better target advertising dollars within those applications.

Wireless Analytics Platform Web Interface

The analytics may be viewed through a web interface. The data are presented within five views: user statistics, traffic statistics, commerce statistics, locations, and custom reports.

Figure 13:
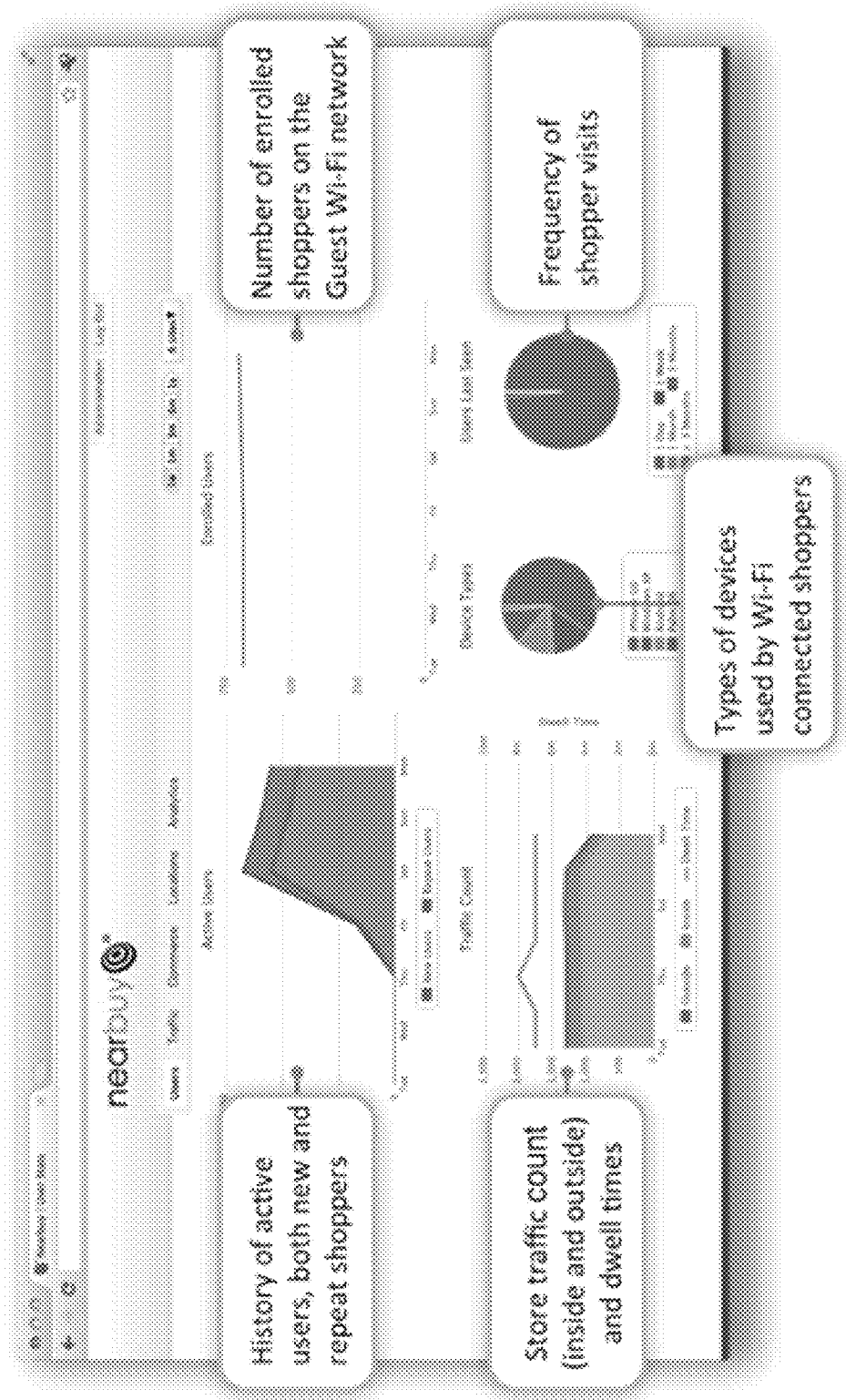
FIG. 13 illustrates user statistics.

FIG. 13 illustrates the user statistics page with annotations. The upper-left chart shows active users separated into new and repeat shoppers. The upper-right chart is the number of shoppers who have enrolled on the guest Wi-Fi network. The lower-left chart depicts the shopper count both inside and outside the store and average dwell time inside the store. The lower-right chart depicts the types of devices used by Wi-Fi connected shoppers and the frequency of shopper visits. All these statistics can be viewed for individual stores or a collection of stores.

Figure 14:
FIG. 14 illustrates traffic statistics.

FIG. 14 illustrates the traffic statistics webpage. The upper-left chart depicts the volume of web traffic in the store. The upper-right chart is a histogram of the number of users versus the number of page loads they perform. The lower-left chart summarizes the most popular websites visited. Finally, the lower-right chart shows the top search terms.

Figure 15:
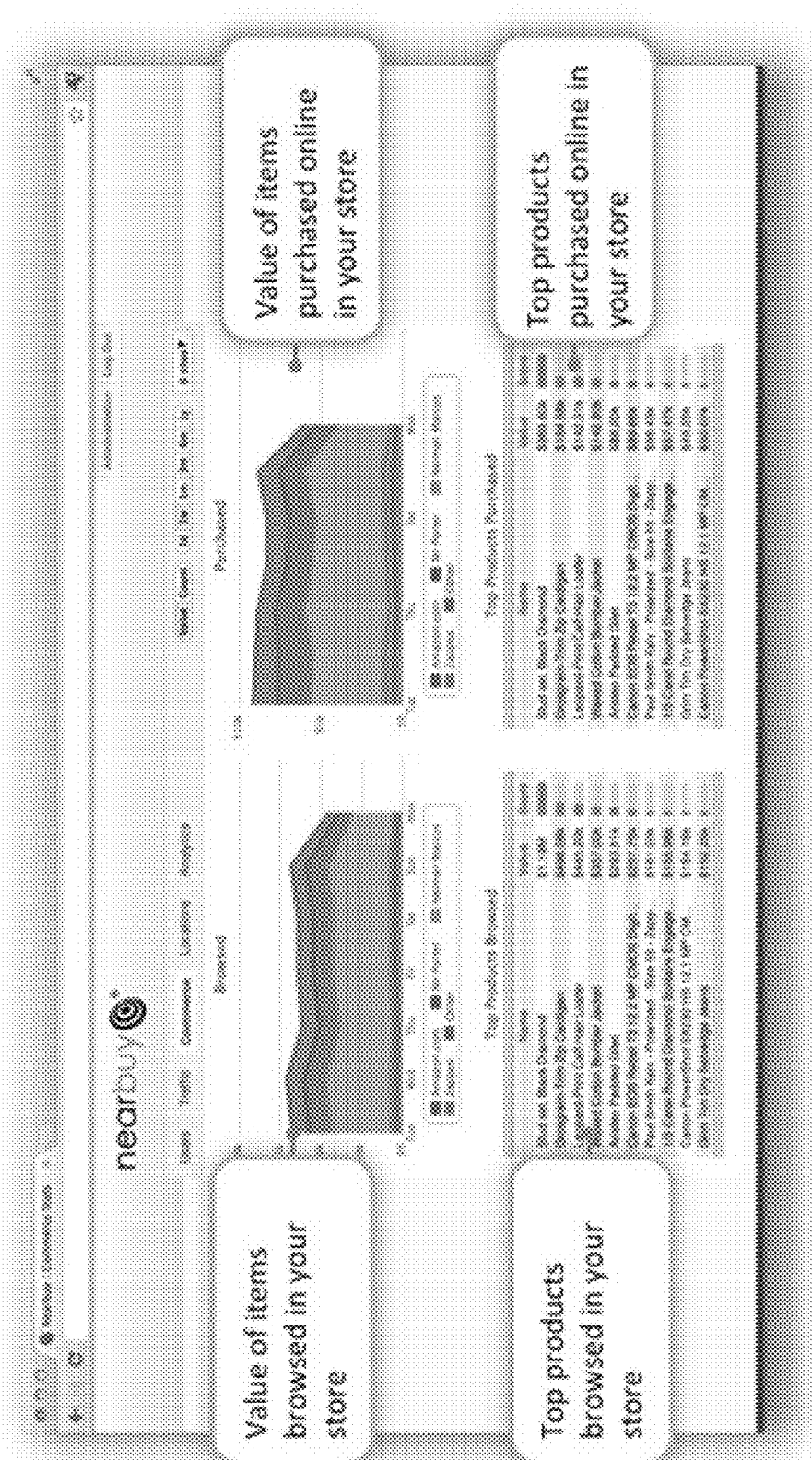
FIG. 15 illustrates commerce statistics.

The Wireless Analytics Platform reports statistics about commerce performed while connected to the retailer's stores. These are illustrated in FIG. 15. These statistics include the value of items browsed in the store categorized by e-commerce retailer; the value of items purchased online within the store, categorized by e-commerce retailer; the top products browsed in the store and their value; and the top products purchased online within the store, and their value.

Figure 16:
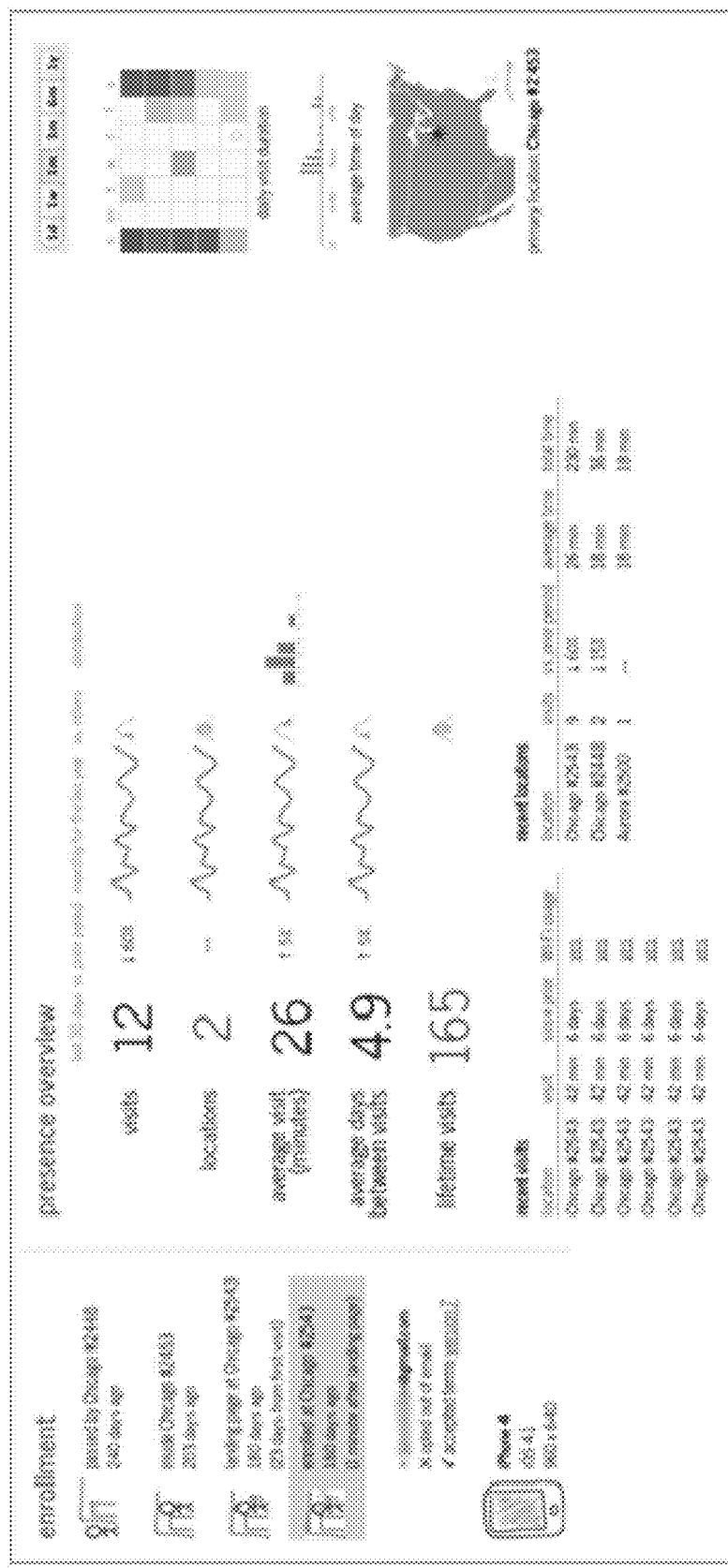
FIG. 16 illustrates presence statistics.

The Presence Service records the time that shoppers enter and exit the retailer's store. It records these times both for clients that have associated to the network as well as clients that are unassociated. Presence can be measured for unassociated clients because Wi-Fi devices send probe requests periodically searching for wireless networks. These statistics are important to retailers since recency, frequency, and duration (RFD) analysis helps retailers segment shoppers. Recency answers the question "How recently did the customer visit the store?" Frequency translates to "How often do they visit the store?" And, duration means "How long do they remain in the store during each visit?" A histogram of these values provides a method to segment a retailer's customers from most to least valuable. A predictive model also may be used to forecast expected future behavior. FIG. 16 illustrates presence statistics for one specific user. It includes information about which stores the shopper has visited, the number of visits, the number of locations, the average visit duration, average days between visits, a histogram of the visit duration, and a histogram of the visit time. This data may be analyzed for one shopper or a collection of shoppers meeting a selected criteria or market segment.

Figure 17:
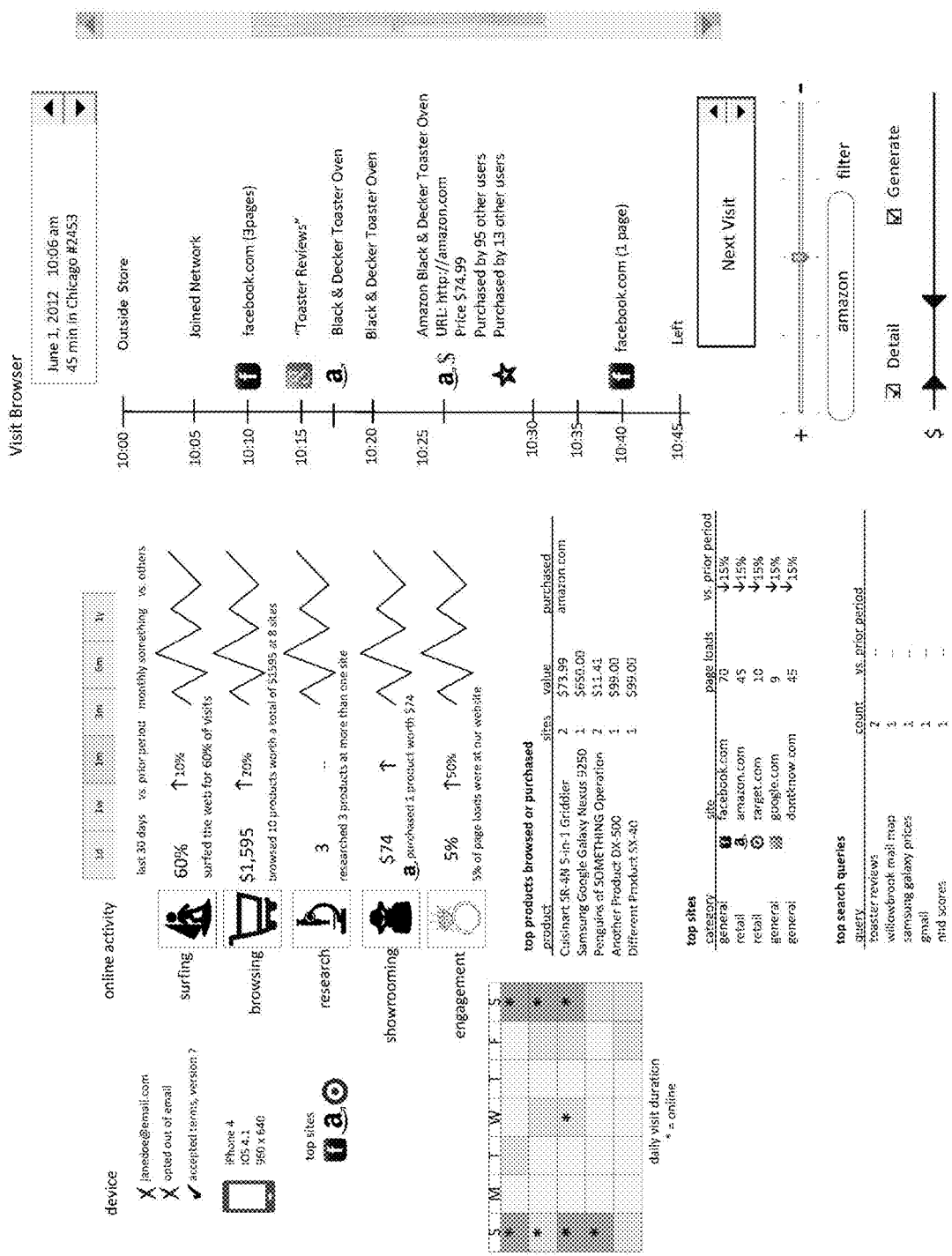
FIG. 17 illustrates user's online activity.

FIG. 17 illustrates a detailed analysis of one shopper's behavior. A snapshot of the user's surfing, browsing, product research, show-rooming, and engagement behavior is provided. The browsing activity is shown as a timeline allowing one to quickly discover trends and habits.

Figure 18:
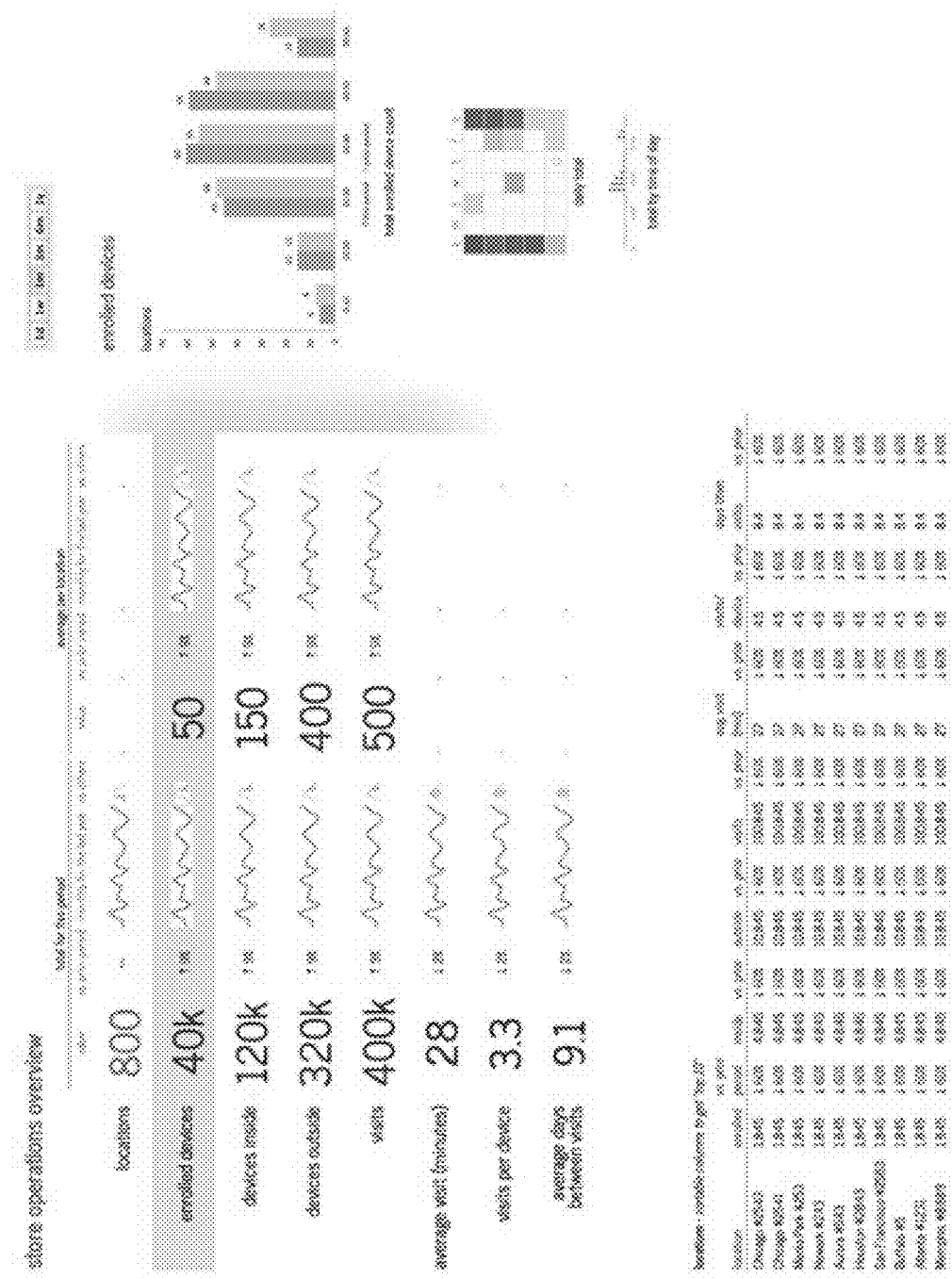
FIG. 18 illustrates store operations overview.

FIG. 18 depicts the Store Operations Overview. It displays information that can be used to judge the performance of a store or a collection of stores. Metrics include the number of enrolled shoppers, the total number of devices inside versus outside stores, the average duration a shoppers remains inside the stores, and the average number of days between visits.

Location

Figure 19:
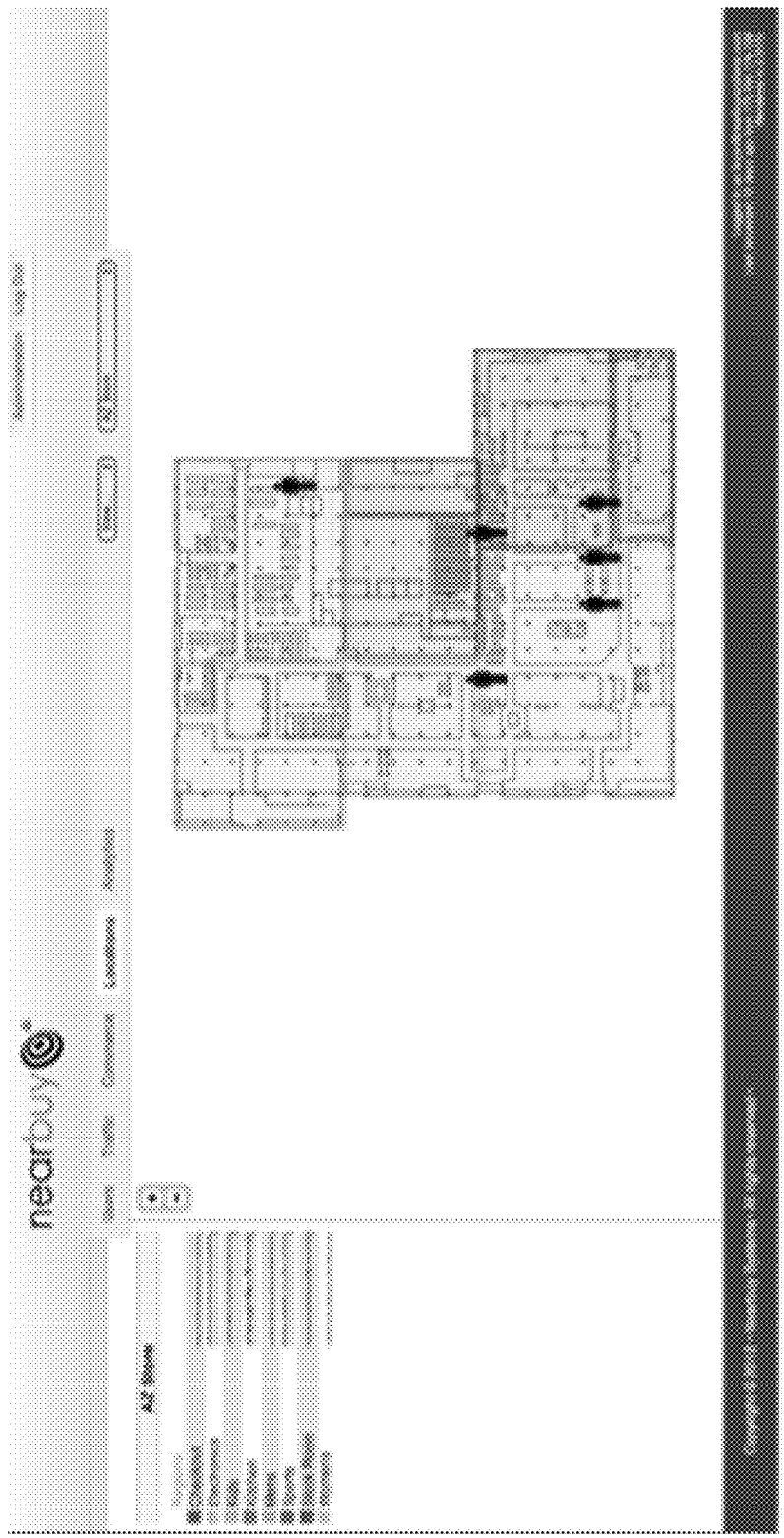
FIG. 19 illustrates a locations tab of a Wireless Analytics Platform.

FIG. 19 is the "Locations" tab of the Wireless Analytics Platform. It shows a map of the retailer's store and where each Wi-Fi client is located. The retailer can define regions of importance, for example the colored polygons overlaid on the map. The shopper density within these regions are calculated and displayed on the left side of the web page.

Figure 20:
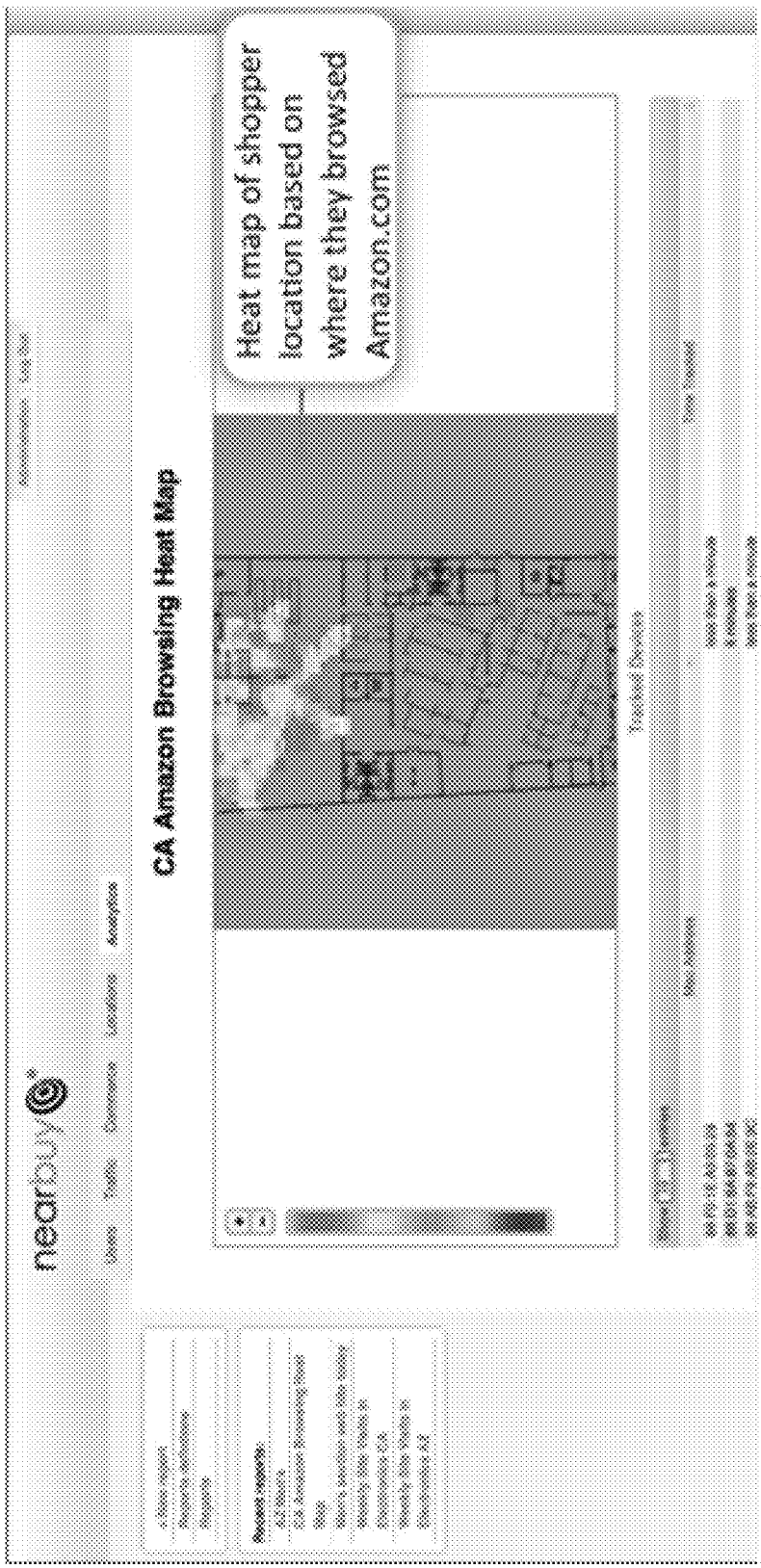
FIG. 20 illustrates a browsing heat map.
Figure 21:
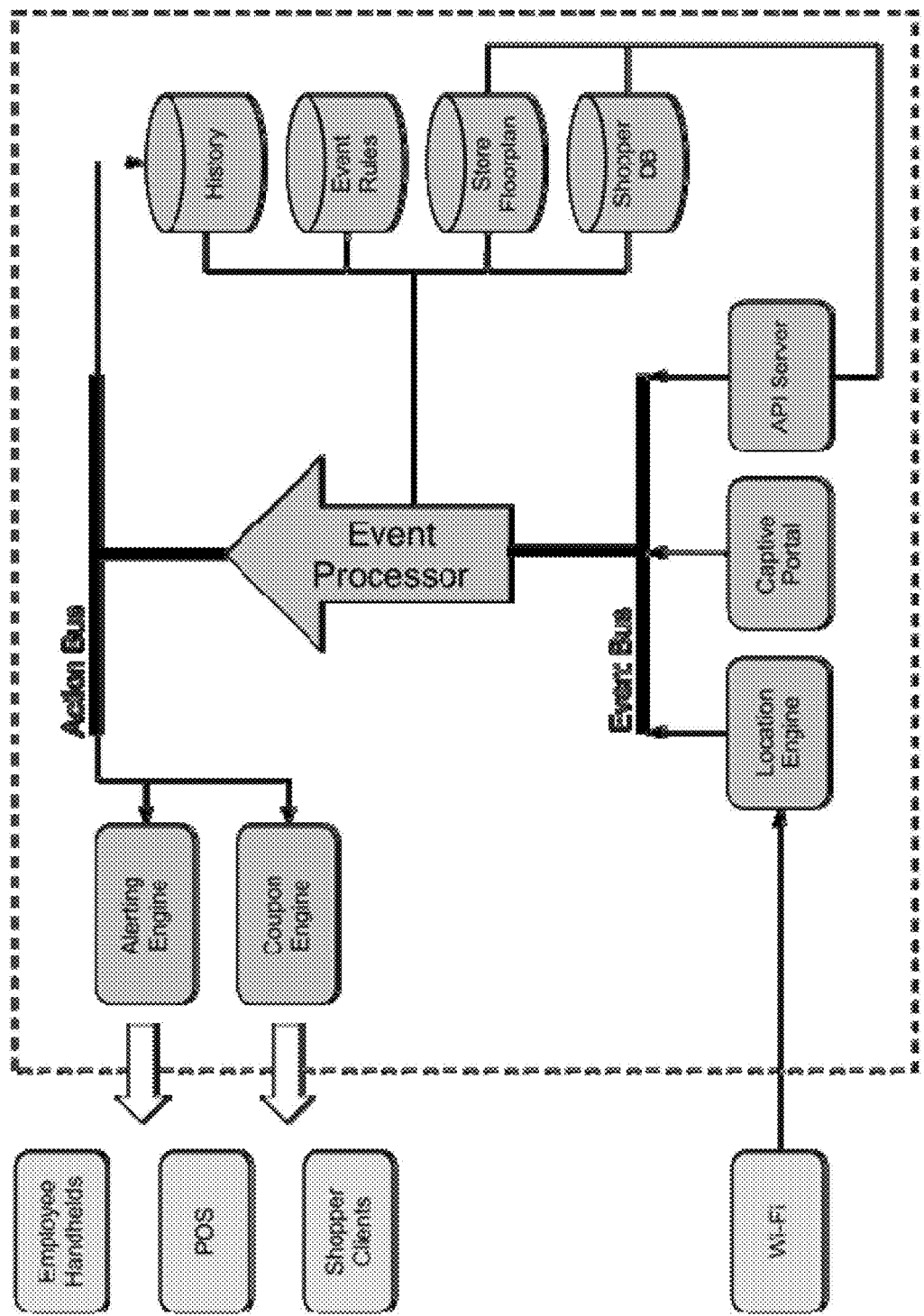
FIG. 21 illustrates an event engine.

Location information becomes even more valuable when shoppers' location density and flow are overlaid with information about their online behavior. As an example, FIG. 20 is a heat map showing where shopper browsed Amazon®.com. This is useful in order to know where a retailer is being show-roomed. They may wish to put more salespeople in these locations to save sales before they are lost to online competitors. Combining information about the shopper's location with their online activity creates a more complete picture of the shopper's behavior.

Events

The Event Engine processes real-time data to generate an event when conditions defined in a rules database are met. For example, an event could alert sales associates to a valuable shopper's arrival in the store. The Event Processor is responsible for causing an action to occur when its input meets the criteria set by of predefined rules. The inputs to the Event Processor include the Location Engine, Captive Portal, API Server, past event history, store floor plan and planogram, and the shopper database. When the input matches an event rule, the event's respective action is executed. An action could be a generic alert, i.e. a VIP customer has entered the store, or it could trigger sending a personalized coupon to a shopper via a pushed message or within a retailer's mobile application.

Analytics Application Programming Interface (API)

The Analytics API is a RESTful interface that provides developers with access to micro-location, guest Wi-Fi data, and events. Developers can use the API to create location-based services for mobile shopping and employee productivity applications and to supplement shopper analytic applications with in-store intelligence.

Location and analytic data from the API are accessed over HTTPS, and available from a web service. All data are sent and received as JSON.

For example, to get the (x, y, z) locations for a client in a given time period, the request is as follows:

GET /2.0/client/:mac/locations?start_time=2011-06-08 16:34:47+00&end_time=2011-06-08 16:37:47+00

And the response would be:

```
[
  {
    "mac_address": "88:0E:5D:97:30:4B",
    "floorplan_id": "6ae1b96d-9599-44b0-afe1-14c66f5b34f2",
    "calc_timestamp": "2011-06-08 16:35:24+00",
    "x": 43.6,
    "y": 38.7
  }
]
```

To subscribe to events, the retailer registers a URL where events will be posted with the Wireless Analytics Platform. The Event Engine will post events to this URL when they are triggered.

Figure 22:
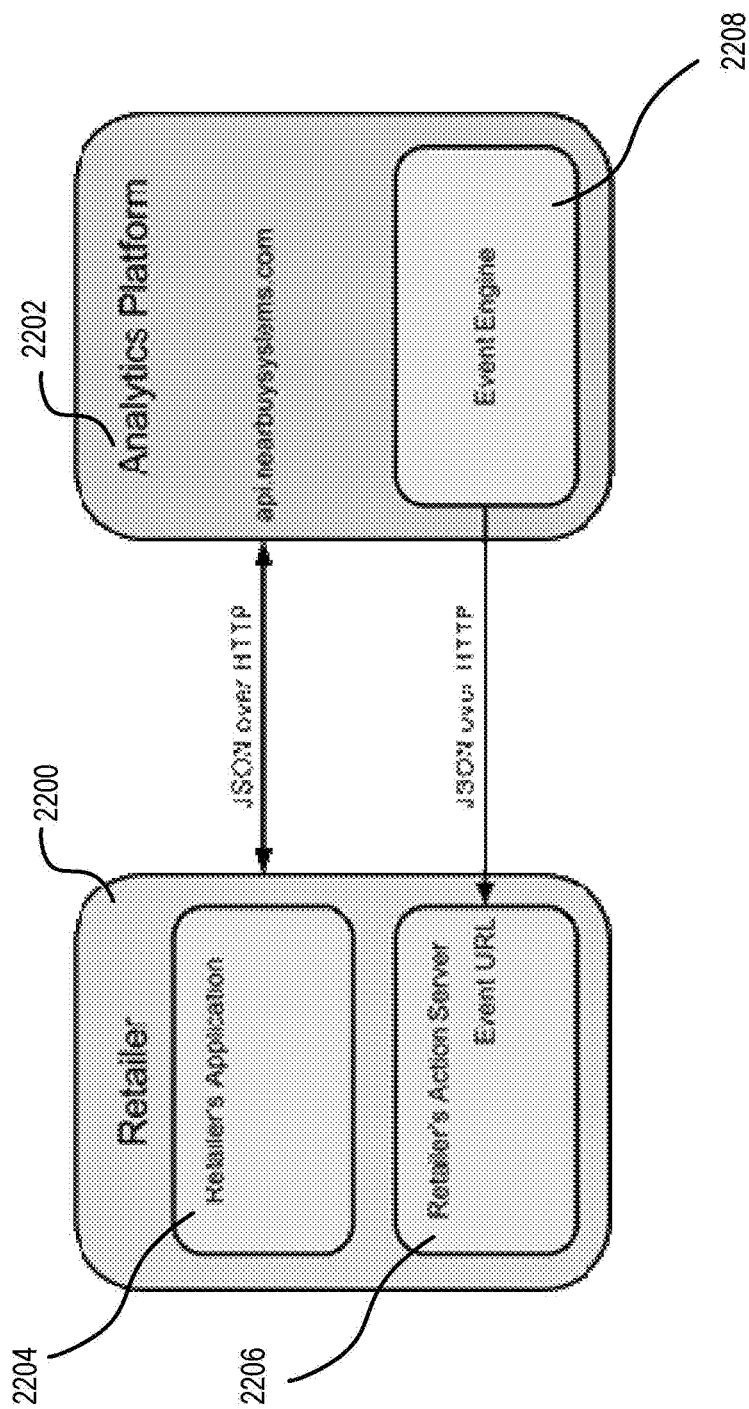
FIG. 22 illustrates a retailer's application making a HTTP request to the Wireless Analytics Platform.

FIG. 22 shows a retailer's application making a HTTP request to the Wireless Analytics Platform's web service. The Wireless Analytics Platform 2202 sends a HTTP response document in JSON format with the requested information. The Event Engine 2208 posts JSON documents over HTTP to a retailer's Action Server 2206 that executes the appropriate action for the event.

Applications

Advertising Keyword Targeting

The Wireless Analytics Platform stores websites visited and search terms. Retailers can target their advertising budget better if they know what websites their shoppers visit, which search terms they query, products they visit, and which languages their shoppers speak.

Mobile Application Advertising

The data collected by the Wireless Analytics Platform is valuable for targeted advertising. A retailer may advertise within their mobile application. These advertisements can be targeted using real-time data from the current shopping behavior of the shopper.

Show Rooming

Show-rooming is the act of examining merchandise in a brick and mortar retail store without purchasing it and then shopping online to find the same item for a lower price. The Wireless Analytics Platform provides information about what products are being show-roomed and the cost of those lost sales. This metric lets the retailer judge how effectively they are combating show-rooming. Furthermore, the system reveals where in the store show-rooming is taking place so that retailers can attempt to reduce lost sales.

New business models may emerge from the use of the Wireless Analytics Platform. For example, show-rooming is having a substantial effect on electronic retailers' sales. However, manufactures need their merchandise to be displayed. Shoppers will not buy many expensive electronic items without first evaluating the product in person. In one model, the retailers are paid cooperative dollars from the manufactures for products that are purchased within their store at online e commerce retailers. In this model, the Wireless Analytics Platform provides metrics about online sales and an audit trail between the retailer and manufacturer.

VIP Customer Alert

Retailers would like a notification when a VIP customer enters the store. This is possible if a retailer has required personally identifiable information that they can tie to their customer relationship management (CRM) system, such as a customer loyalty card number, phone number, or email during the Wi-Fi enrollment and registration process. This links the MAC address of the shopper's device to a customer record in the CRM system. When the Wireless Analytics Platform detects the presence of a wireless device whose MAC address matches a VIP customer in the CRM system, it sends an alert to a store associate. Included in the alert may be information about the shopper such as a personalized recommendation of products that may interest the shopper based on past purchases.

Location Analytics and Applications

Tracking the location of the shopper benefits the retailer by giving the ability to promote products or services that are relevant to the current or past locations of that shopper. In this case, the current location and location history of the shopper enables the personalization of specific offers and promotions. By understanding shoppers' behavior, retailers and manufactures can influence the shopper at their point-of-decision—within the aisle of the store. For example, the optimal time for the retail grocery store to send a customer a Coca-Cola promotion to their phone is while he is walking down the soda aisle.

The Wireless Analytics Platform studies the travel patterns of customers with wireless devices. Location data can provide a wealth of information on shopper and employee patterns within the store. Retail marketers can use this information to better understand how shoppers traverse the store, where they dwell, and how certain offers and promotions influence their behavior in the physical store. Path segmentation helps determine if a customer is deliberately looking for an item to purchase or just leisurely browsing. Retailers can utilize this kind of information to allocate store associates better in real-time.

Retailer store managers can utilize employees' locations to better understand how employees are traveling the store to complete tasks, to optimize workflows, route the nearest employee to a customer in need of help.

Online-to-Offline Conversion

Using the Wireless Analytics Platform, retailers can measure the conversion rate of promotions resulting in driving traffic to their stores. For example, a promotion shown within the retailer's iPhone application may encourage a shopper to come see the new fashion line being introduced. If the shopper enters the store within a certain time after the promotion is introduced, the Wireless Analytics Platform will record their entry and mark the conversion. The Wireless Analytics Platform can measure the number of people who saw the promotion versus the number that visited the retail store.

A method is needed to tie the impression of the promotion within an application to the MAC address of the shopper's mobile device. In one embodiment, when the promotion is viewed, the application sends the MAC address of the wireless device to a database, recording that the MAC address has viewed the promotion. To calculate the conversion rate, the database of MAC addresses that have viewed the promotion may be cross-referenced with the MAC addresses of devices that have entered a store.

Similarly, if the wireless enrollment and registration process also requires an email, then the conversion rate of promotional emails can be measured.

Product Ranging

The Wireless Analytics Platform may be used to determine product ranging. The retail product range is the assortment of goods and services offered for sale by a retailer. The particular range offered at a specific retail location or during a specific time of year may be tailored to the needs of the targeted shoppers. The Wireless Analytics Platform helps retailers discover products that are of interest to their customers but are not carried in their stores. If a shopper enters a store and does not find a particular product, they may order it online while still in the store. This may be an indicator to a retailer to expand their product range.

Price Optimization

Current price optimization software takes as input point-of-sale information and seasonal sales data at the store level. The data feeds probability and forecasting algorithms to create a set of demand curves for a particular product in a particular store. The demand curve identifies the products that are the most and least price-sensitive. Additional optimization routines leverage these demand curves to determine optimal recommended pricing.

Price optimization requires creating the demand curve. Current solutions only utilize data from positive examples, i.e. counting the number of people who purchased a product at a certain price. The Wireless Analytics Platform gives retailers insights into purchases within their store at competitors' e-commerce websites. The retailer normally does not have visibility into these lost sales. This data can help price optimization.

Re-Engage Customers

Using presence information, a retailer can determine that a shopper has not visited their stores for an extended amount of time. Incentives may be pushed to this shopper in order to bring the shopper into a store again and try to re-establish a habit of shopping with the retailer.

Personalization

The Wireless Analytics Platform's behavioral data allows a retailer to personalize the shopping experience specifically for a shopper. For example, a retailer may influence a shopper with a highly targeted list of alternative products, advertisements, offers, or promotions based on that shopper's online activity, current location, and their path through the store.

The Wireless Analytics Platform enables real-time competitive pricing. The Event Engine may trigger sending a promotion to a customer in the store, if they visit a website on their mobile device to compare prices. Promotion pricing is determined by monitoring a customer's online behavior including the products and their prices viewed at competitor's e commerce sites.

Customers can request help and summon a store associate to their location. For example, if the customer needs assistance the customer can push a "help" button within a mobile application or web page, which can summon an in-store sales associate to help them fulfill the purchase or answer questions. The Analytics Platform can relay this request to a device the in-store associated is using, such as a mobile phone, PDA, etc. or to a centralized console, which can generate an employee notification.

Shopper Density and Flow

The Wireless Analytics Platform includes real-time location tracking. The analysis of the spatial density and flow of shoppers is very valuable. For retail stores it helps them determine a price to charge manufactures for product placement. Locations with a higher density of shoppers are more valuable.

Shopping mall operators may use shopper density to optimize the lease prices they charge retailers as well as conserve energy during non-peak hours.

Workforce Analytics

In the next-generation store, the retailer's sales associates are equipped with their own mobile devices so that they can utilize many of the same online resources that shoppers want to access from their smartphones: detailed product information or videos, product reviews and social media commentary, pricing, and inventory information. Furthermore, equipping associates with mobile devices allows store managers to gain real-time visibility into shopper and associate locations, enabling them to redeploy staff to the areas of the store where they will increase sales the most.

A/B and Multivariate Testing

The design of experiments field and specifically single or multivariable testing attempt to identify causal relationships through experiments. In the simplest controlled experiment, often referred to as an A/B test, users are randomly exposed to one of two variants: Control (A), or Treatment (B). The variant may change one or more aspects of the Control (A)'s design. Examples of retail design changes include the window display, promotional signs, employee training, etc. Controlled experiments provide a way to assess the impact of modifying a design feature. Based on observations collected, a key performance indication (KPI) is derived for each variant. Through a regression analysis features that are statistically significant are identified and may be used to improve the KPI.

In practice, the Wireless Analytics Platform measures performance, for example a window conversion rate. The customer defines additional external inputs (promotions, window displays, POS data, CRM data, etc.). A regression analysis determines which factors have the most likely impact on desired outcomes.

Event Impact

Shopping malls often run events in order to bring people into the mall. Mall operators would like to measure how many people come to an event, as well as if they stay to shop after the event. How many stores do they visit after the event? What stores did they visit after the event? How long do they stay in the mall after the event? These questions are very difficult to answer with current technology. Wi-Fi presence and location provide answers to these questions. Furthermore, if demographic information is available, does an event targeted at teenagers drive out another demographic?

Window Conversion Metric

Retailers wish to entice shoppers into their stores through their window displays. The Wireless Analytics Platform's presence system delineates between people inside a store versus outside a store. This data is used to calculate a window conversion metric. This metric measures how many shoppers outside the store enter the store. Retailers may optimize their window displays, by trying to maximize their conversion metric.

People Counting

Currently, retailers use stereo video cameras to count shoppers in their stores. These systems are expensive to deploy. The Wireless Analytic Platform's presence system performs people counting inherently for shoppers with mobile devices. Although, this count only represents shoppers with mobile devices, statistically this count may be extrapolated based on percentages of people with smart phones. The percentage of people with smart phones can be inferred either by calibrating the count at stores employing a video system or by analysis of the point-of-sale data. Furthermore, the Wireless Analytic Platform can measure shoppers' dwell time within a store, which video camera people counting solutions cannot.

A number of embodiments have been described. Nevertheless, it will be understood that various modifications may be made. For example, other steps may be provided, or steps may be eliminated, from the described flows, and other components may be added to, or removed from, the described systems. Accordingly, other embodiments are within the scope of the following claims.

What is claimed is:

1. A method for connecting to a wireless network, the method comprising:
   receiving, at an access point, a first request from a wireless device to access a wireless network;
   determining, based on authentication by an authentication server, that the first request is an initial request from the wireless device to access the wireless network;
   providing, by a captive portal, a landing page to the wireless device for entering registration information in response to the determining that the first request is the initial request from the wireless device to access the wireless network;
   receiving, by the captive portal, the registration information from the wireless device;
   collecting, by the captive portal, additional information from the wireless device that is independent from the registration information, the additional independent information being stored on the authentication server;
   granting, by the captive portal in response to the first request, the wireless device network access;
   receiving, at the access point, a second request from the wireless device to access the wireless network at a time subsequent to the initial request;
   authenticating, by the authentication server, the wireless device based on a portion of the independent information collected from the wireless device and stored on the authentication server; and
   granting, by the captive portal upon authenticating the wireless device based on the portion of the independent information collected from the wireless device and stored on the authentication server, the wireless device access to the wireless network in response to a determination that the wireless device is within communication range of a wireless access point of the wireless network.

2. The method of claim 1, further comprising:
   receiving a notification when the wireless device has accessed the wireless network; and
   responsive to receiving the notification, causing a process within a mobile application running on the wireless device to be automated.

3. The method of claim 1, further comprising:
   collecting information about the access, including a time and location of the access; and
   generating a report based on the access information.

4. The method of claim 1, further comprising:
   determining that a user of the wireless device has previously reviewed or accepted a first version of rules associated with the wireless network; and
   providing the wireless device with a second version of the rules, where the second version of the rules is different from the first version of the rules.

5. The method of claim 1, wherein the information collected from the wireless device includes at least a media access control (MAC) address of the wireless device.

6. The method of claim 5, wherein granting the wireless device access to the wireless network based on at least some of the collected information comprises granting the wireless device access to the wireless network based on the MAC address of the wireless device.

7. The method of claim 5, wherein the information collected from the wireless device further includes a device type, an operating system type and version, a browser type, and a screen size of the wireless device.

8. The method of claim 1, further comprising:
   collecting, at a web traffic collector, outgoing hypertext transfer protocol (HTTP) requests upon granting the wireless device network access; and
   storing the collected requests in a data storage for analysis.

9. The method of claim 1, further comprising:
   detecting, at the access point, a presence of the wireless device in the wireless network; and
   periodically collecting three dimensional location information of the wireless device when the wireless device is in the presence of the wireless network.

10. The method of claim 1,
    detecting, at the access point, a presence of the wireless device in the wireless network; and collecting an entry time and an exit time of the wireless device when entering and exiting a presence of the wireless network.

11. The method of claim 1, further comprising:
when connected to the wireless device, collecting an entry and an exit times when the wireless device accesses the wireless network.

12. The method of claim 1, further comprising:
when connected to the wireless device, periodically collecting three dimensional location information of the wireless device.

13. A system for connecting to a wireless network, comprising:
one or more processors; and
a non-transitory computer readable medium coupled to the one or more processors and configured to store instructions, which, when executed by the one or more processors, cause the one or more processors to perform operations comprising:
receiving, at an access point, a first request from a wireless device to access a wireless network;
determining, based on authentication by an authentication server, whether the first request is an initial request from the wireless device to access the wireless network;
providing, by a captive portal, a landing page to the wireless device for entering registration information in response a determination that the first request is the initial request from the wireless device to access the wireless network;
receiving, by the captive portal, the registration information from the wireless device;
collecting, by the captive portal, additional information from the wireless device that is independent from the registration information, the additional independent information being stored on the authentication server;
granting, by the captive portal in response to the first request, the wireless device network access;
receiving, at the access point, a second request from the wireless device to access the wireless network at a time subsequent to the initial request;
authenticating, by the authentication server, the wireless device based on a portion of the independent information collected from the wireless device and stored on the authentication server; and
granting, by the captive portal upon authenticating the wireless device based on the portion of the independent information collected from the wireless device and stored on the authentication server, the wireless device access to the wireless network in response to a determination that the wireless device is within communication range of a wireless access point of the wireless network.

14. The system of claim 13, where the non-transitory computer readable medium further stores instructions, which, when executed by the one or more processors, causes the one or more processors to perform operations comprising:

receiving a notification when the wireless device has accessed the wireless network; and
responsive to receiving the notification, causing a process within a mobile application running on the wireless device to be automated.

15. The system of claim 13, where the non-transitory computer readable medium further stores instructions, which, when executed by the one or more processors, causes the one or more processors to perform operations comprising:
determining that a user of the wireless device has previously reviewed or accepted a first version of rules associated with the wireless network; and
providing the wireless device with a second version of the rules, where the second version of the rules is different from the first version of the rules.

16. The system of claim 13, wherein the information collected from the wireless device includes at least a media access control (MAC) address of the wireless device.

17. The system of claim 16, wherein the information collected from the wireless device further includes a device type, an operating system type and version, a browser type, and a screen size of the wireless device.

18. The system of claim 13, wherein granting the wireless device access to the wireless network based on at least some of the collected information comprises granting the wireless device access to the wireless network based on a MAC address of the wireless device.

19. The system of claim 13, wherein the non-transitory computer readable medium further stores instructions, which, when executed by the one or more processors, causes the one or more processors to perform operations comprising:
collecting, at a web traffic collector, outgoing hypertext transfer protocol (HTTP) requests upon granting the wireless device network access; and
storing the collected requests in a data storage for analysis.

20. The system of claim 13, where the non-transitory computer readable medium further stores instructions, which, when executed by the one or more processors, causes the one or more processors to perform operations comprising:
detecting, at the access point, a presence of the wireless device in the wireless network;
when in the presence of the wireless network, and collecting an entry time and an exit time of the wireless device when entering and exiting a presence of the wireless network and periodically collecting three dimensional location information of the wireless device; and
when connected with the wireless device, periodically collecting three dimensional location information of the wireless device, and periodically collecting an entry and an exit time when the wireless device accesses the wireless network.

* * * * *